(12) United States Patent
Tang et al.

(10) Patent No.: US 12,306,016 B2
(45) Date of Patent: *May 20, 2025

(54) CONTINUOUS EDGE ADJUSTABLE LEVEL

(71) Applicant: Milwaukee Electric Tool Corporation, Brookfield, WI (US)

(72) Inventors: Haoming Tang, Dongguan (CN); Samuel J. Howard, Hales Corners, WI (US); Anthony S. Graykowski, Belgium, WI (US); Daniel L. Block, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/301,758

(22) Filed: Apr. 17, 2023

(65) Prior Publication Data

US 2023/0251085 A1 Aug. 10, 2023

Related U.S. Application Data

(63) Continuation of application No. 17/381,453, filed on Jul. 21, 2021, now Pat. No. 11,650,053, which is a continuation of application No. 16/519,718, filed on Jul. 23, 2019, now Pat. No. 11,085,763, which is a continuation of application No. PCT/US2019/041031, filed on Jul. 9, 2019.

(30) Foreign Application Priority Data

Jul. 10, 2018 (CN) .......................... 201810750787.1

(51) Int. Cl.
*G01C 9/34* (2006.01)
*G01C 9/26* (2006.01)

(52) U.S. Cl.
CPC ................. *G01C 9/26* (2013.01); *G01C 9/34* (2013.01)

(58) Field of Classification Search
CPC .................................... G01C 9/26; G01C 9/34
USPC ........................................................... 33/379
See application file for complete search history.

(56) References Cited

U.S. PATENT DOCUMENTS 3,648,378 A 3/1972 Thingstad et al.
4,130,943 A 12/1978 Talbot
(Continued)

FOREIGN PATENT DOCUMENTS

CN 2647985 10/2004
CN 104168858 11/2014
(Continued)

OTHER PUBLICATIONS

Youtube, "Stabila Extendable Levels", [https://www.youtube.com/watch?v=FFOfGAJXBMk], posted Jul. 12, 2017, 1 page.
(Continued)

*Primary Examiner* — George B Bennett
(74) *Attorney, Agent, or Firm* — Reinhart Boerner Van Deuren s.c.

(57) ABSTRACT

An extendible or adjustable length level is provided. The level includes a frame, a slidable member, and a bushing. The slidable member is coupled to the frame and extends and retracts along the frame. The bushing is coupled to one of the frame or the slidable member and couples the frame and slidable member together.

20 Claims, 38 Drawing Sheets

(56) References Cited

U.S. PATENT DOCUMENTS

| | | | |
|---|---|---|---|
| 4,733,475 A | 3/1988 | Youmans | |
| 4,928,395 A | 5/1990 | Good | |
| 5,433,011 A | 7/1995 | Scarborough et al. | |
| 6,041,510 A | 3/2000 | Huff | |
| 6,058,617 A * | 5/2000 | Nadu | G01C 9/26 33/366.12 |
| 6,279,240 B1 | 8/2001 | Bonaventura, Jr. | |
| 6,637,120 B2 | 10/2003 | Pustay | |
| 6,658,752 B1 | 12/2003 | Bonaventura, Jr. | |
| 7,497,022 B1 * | 3/2009 | Aarhus | G01C 9/26 33/376 |
| 8,286,363 B1 | 10/2012 | Martinez | |
| D866,365 S | 11/2019 | Graykowski et al. | |
| 11,085,763 B2 * | 8/2021 | Tang | G01C 9/28 |
| 11,199,403 B2 * | 12/2021 | Kirby | G01C 9/26 |
| 11,255,667 B1 | 2/2022 | Panosian et al. | |
| 2002/0073565 A1 | 6/2002 | Schooley | |
| 2002/0121026 A1 | 9/2002 | Pustay | |
| 2008/0115453 A1 * | 5/2008 | Basford | G01B 3/566 52/749.13 |
| 2009/0113733 A1 | 5/2009 | Hale | |
| 2013/0326895 A1 * | 12/2013 | Bureau | G01C 9/26 33/379 |
| 2015/0128432 A1 | 5/2015 | Penneman | |
| 2016/0018222 A1 | 1/2016 | Oppenheim | |
| 2017/0227359 A1 | 2/2017 | Kallabis et al. | |
| 2017/0370715 A1 | 12/2017 | Kennis | |
| 2018/0156612 A1 * | 6/2018 | Miller | G01C 9/24 |
| 2019/0265032 A1 | 8/2019 | Dorscheid et al. | |
| 2022/0163326 A1 | 5/2022 | Kirby et al. | |

FOREIGN PATENT DOCUMENTS

| | | |
|---|---|---|
| EP | 1480010 | 11/2004 |
| WO | WO85/02660 | 6/1985 |

OTHER PUBLICATIONS

International Search Report and Written Opinion for International Application No. PCT/US2019/041031, dated Oct. 25, 2019, 12 pages.

* cited by examiner

CONTINUOUS EDGE ADJUSTABLE LEVEL

CROSS-REFERENCE

The present application is a continuation of U.S. application Ser. No. 17/381,453, filed Jul. 21, 2021, which is a continuation of U.S. application Ser. No. 16/519,718, now U.S. Pat. No. 11,085,763, filed Jul. 23, 2019, which is a continuation of International Application No. PCT/US2019/041031, filed Jul. 9, 2019, which claims the benefit of and priority to Chinese Application No. 201810750787.1 filed on Jul. 10, 2018, each of which are incorporated herein by reference in their entireties.

BACKGROUND OF THE INVENTION

The present invention relates generally to the field of tools. The present invention relates specifically to a tool, such as a level, a spirit level, a digital level, etc., that is extendable such that its length may be adjusted as needed by a user. Levels, such as spirit levels, are used to determine the levelness of a structure, surface or workpiece. In use, the level is placed on or in contact with a surface to be measured, and the user views the location of a bubble within a vial (or other levelness indicator such as a digital display) relative to markings that indicate the levelness of the structure, surface or workpiece.

SUMMARY OF THE INVENTION

One embodiment of the invention relates to a level configured to have an adjustable longitudinal length. The level comprises a frame slidably engaged with an extension, such as a movable body member. The level comprises a braking mechanism that frictionally resists movement between the frame and the extension.

The level frame comprises a longitudinal axis delimited by a fixed end and an open end. The frame and the extension have bottom surfaces that are coplanar with each other, and an adjustable end of the extension slidably extends past the open end of the frame.

Broadly speaking, the level can be placed in variety different configurations: a fully-retracted configuration, a fully-extended configuration and a large number of partially-extended configurations as may be selected by the user. In the fully-retracted configuration, the extension is fully retracted and the distance between the frame's fixed end and the extension's adjustable end is minimized. In the fully-extended configuration, the extension is fully extended from the frame to maximize the distance between the frame's fixed end and the extension's adjustable end. In the partially-extended configuration, the extension, as should be expected, is partially extended from the frame (i.e., partway between the fully-extended configuration and the fully-retracted configuration).

In various embodiments, the level comprises one or more bushings that comprise a spring exerting a force between the frame and the extension. The extension comprises a cavity that extends along the longitudinal axis and engages around one or more protrusions from the frame, such as by a dovetail fit. The bushing spring exerts a force that pushes the extension and the frame away from each other.

In various embodiments, the level comprises a braking mechanism that controls the ease with which the extension and the frame can be slid along each other. The braking mechanism engages with the extension, which allows a user to adjustably control a frictional force needed to axially adjust the extension with respect to the frame.

In various embodiments, the vials are set in front of a color-contrasting background to facilitate the readability of the vials. For example, in one or more embodiments the vials includes a blue liquid and the background of the vial holder is white.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Figure 1:
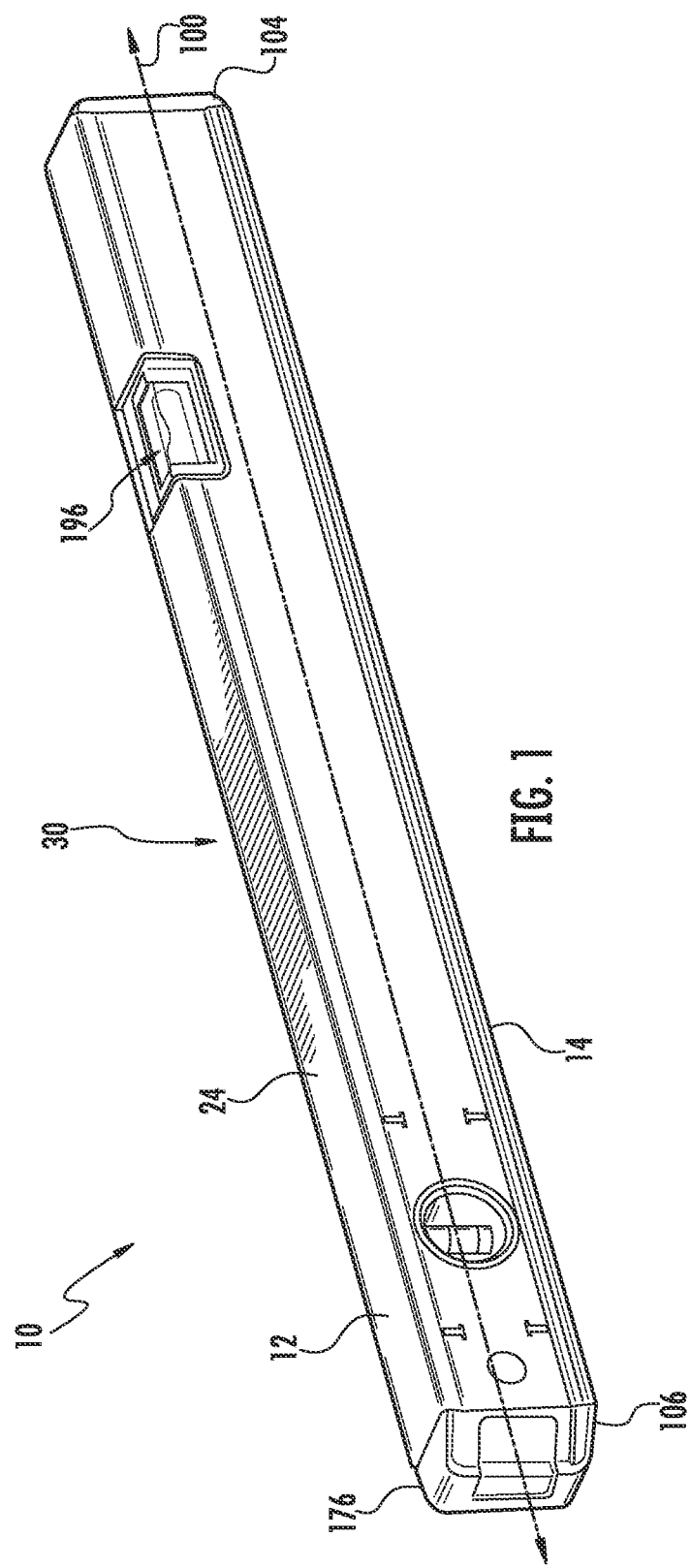
FIG. 1 is a perspective view of a level, according to an exemplary embodiment.
Figure 2:
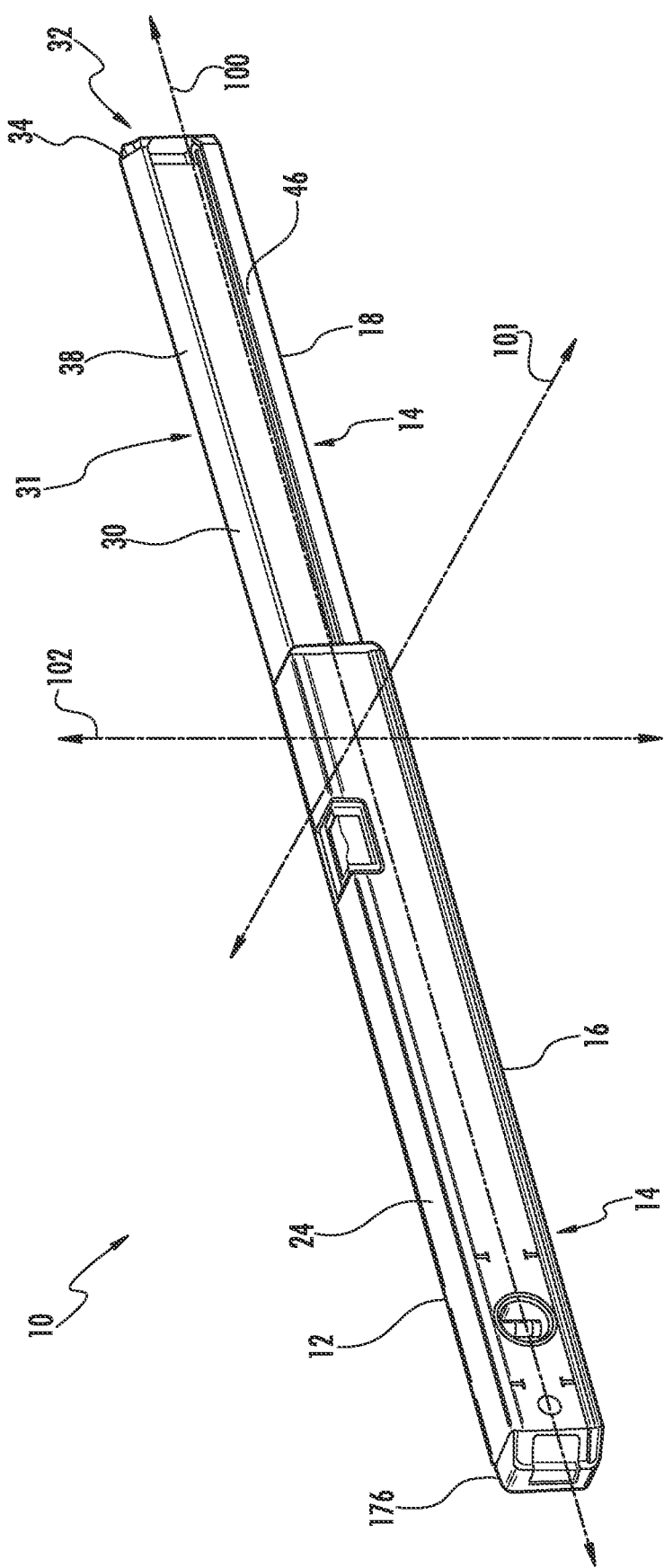
FIG. 2 is a perspective view of the level of FIG. 1 with the slidable body member extended.
Figure 3:
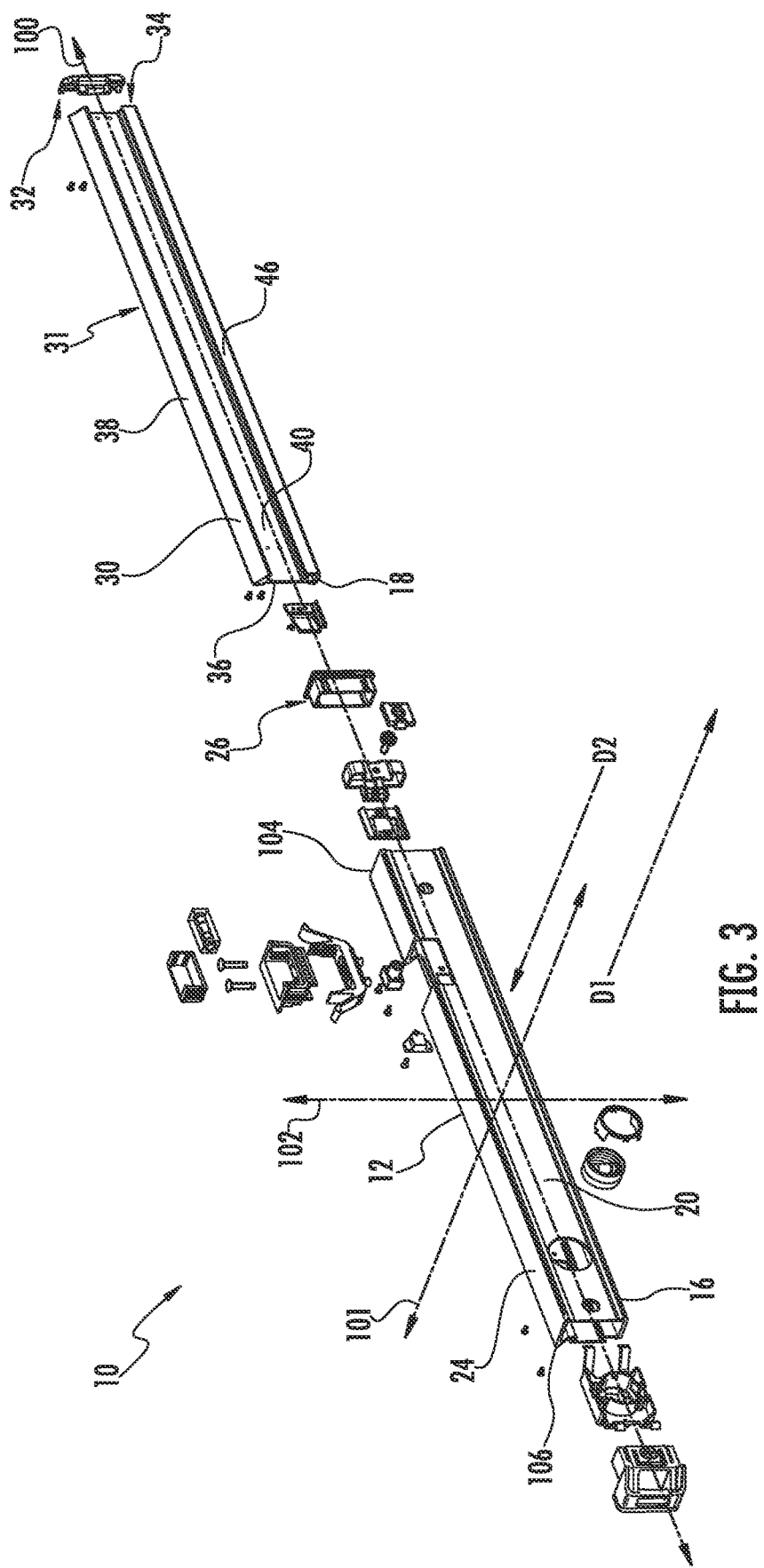
FIG. 3 is an exploded perspective view of the level of FIG. 1.
Figure 4:
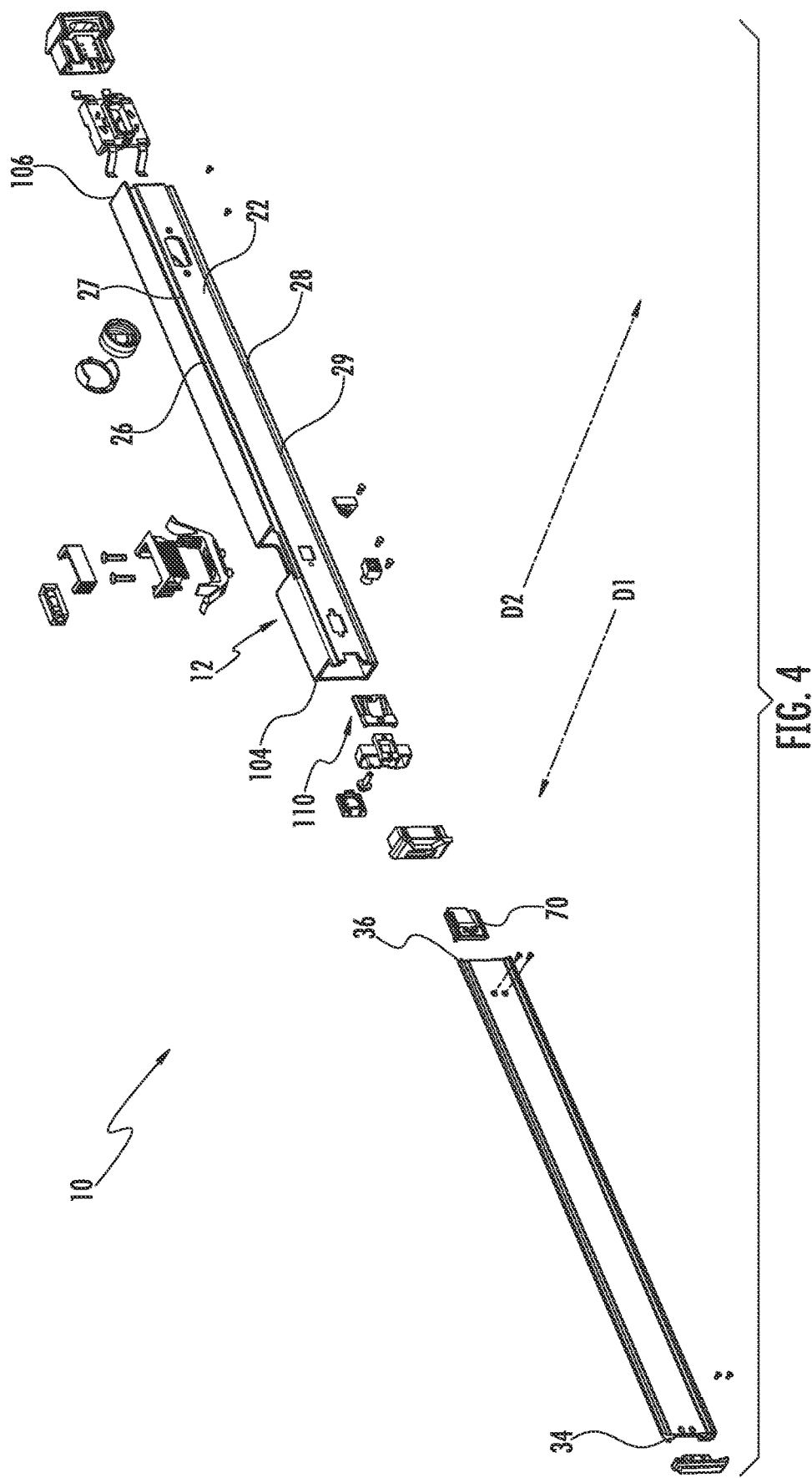
FIG. 4 is an exploded perspective view of the level of FIG. 1, viewed from another perspective.
Figure 5:
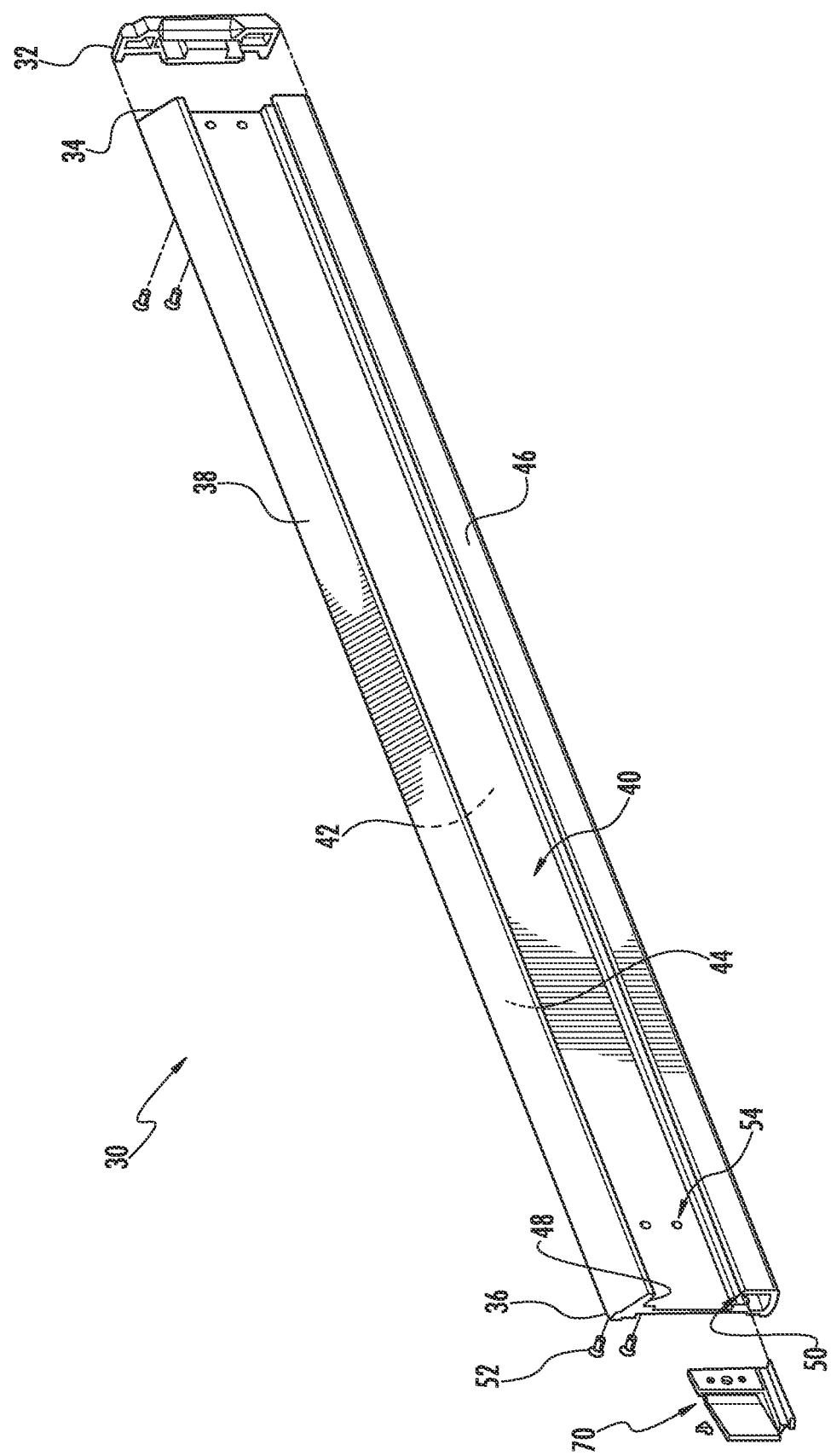
FIG. 5 is a perspective view of an extension piece including a rear bushing, according to an exemplary embodiment.
Figure 6:
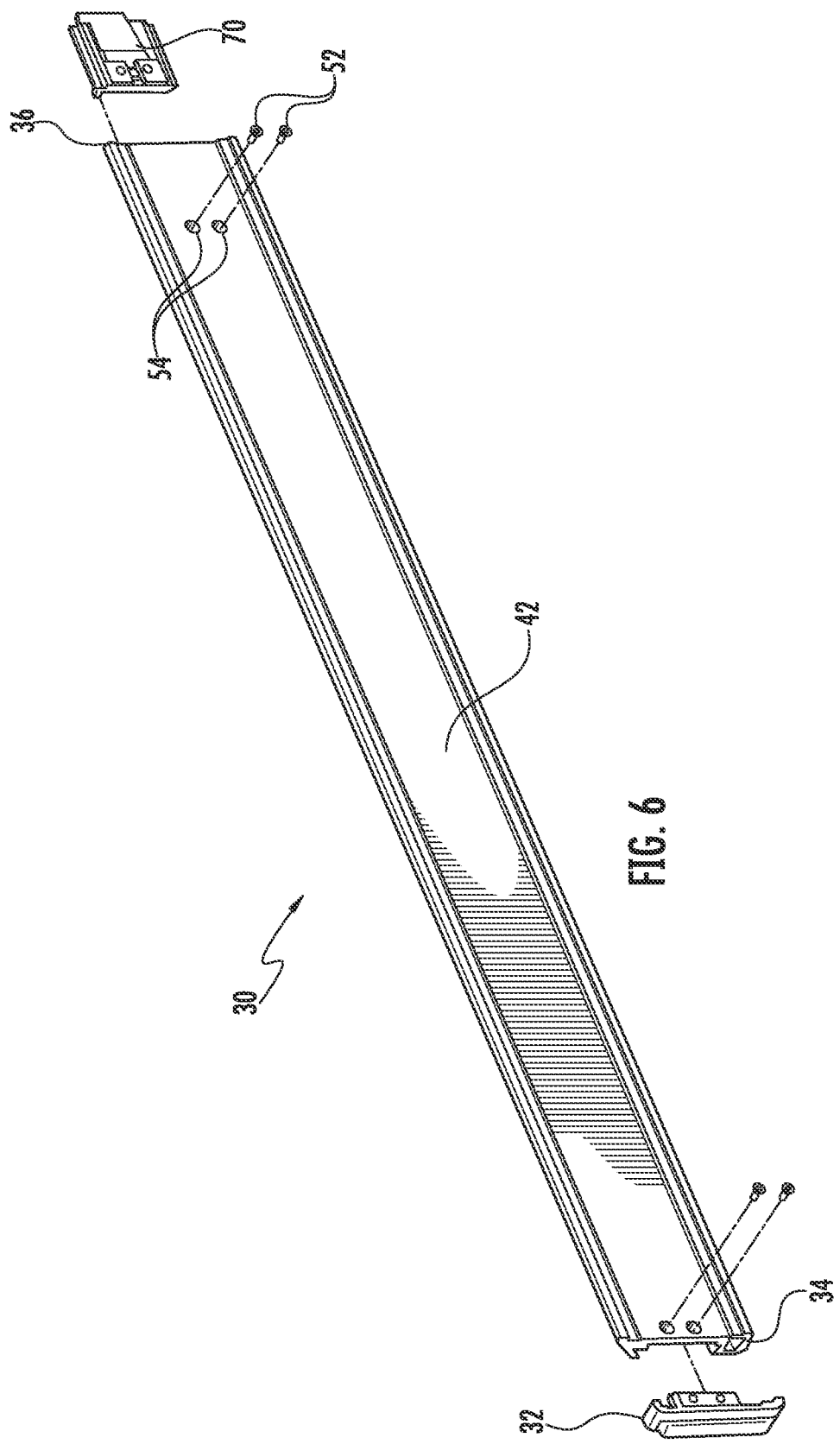
FIG. 6 is a perspective view of the extension piece of FIG. 5, viewed from another perspective.

Referring generally to the figures, various embodiments of a level, such as a spirit level, are shown. In general, levels have one or more precision surfaces used for engagement with a workpiece during leveling. The level discussed herein is designed such that the level's length can be adjusted by the user as needed for various leveling applications. As will be discussed in more detail below, Applicant has developed a variety of innovative mechanisms for an extendable level that provide for smooth and stable relative motion between level sections, adjustable level of friction between level sections, a high visibility vial surround arrangement particularly suited to an extendable level design and/or an end cap design particularly suited to an extendable level design. In general, the levels discussed herein are extendable and are configured to engage a workpiece with at least one extendable and continuous working surface. As used herein an extendable continuous working surface is one that is both length adjustable and that defines a contiguous, coplanar working surface that extends uninterrupted between opposing first and second ends of the level.

In a specific embodiment, Applicant's level provides a level with a primary body and an extension piece that have coplanar upper and lower working surfaces. A benefit of this configuration is that, independent of length the level has been adjusted to, the level provides one or more continuous coplanar working surface to engage with the desired surface of a workpiece.

In various embodiments, the extension is moved along level frame via a longitudinal axis to expand or contract the length of the level. The extension comprises an internal cavity that extends along its length and engages around one or more protrusions from the frame. The interface between the extension and the frame is further affected by two bushings. One bushing is coupled to the frame and comprises a spring that is biased against the extension, exerting a force between the frame and the extension. The other bushing is coupled to the extension and comprises a spring that is biased against the frame, also exerting a force between the extension and the frame.

In various embodiments, the level comprises a braking mechanism that can be adjusted to control an amount of friction that resists axial movement between the extension and the frame. This braking mechanism is adjustable by the user of the level which allows the user to control the amount of resistance to axial movement provided by the braking mechanism. In specific embodiments, the braking mechanism comprises a screw that engages with a threaded brake that exerts an adjustable amount of lateral force against the extension.

Referring to FIGS. 1-6, an extendable, expandable or continuous edge length adjustable level, such as level 10, is shown according to an exemplary embodiment. In general, level 10 is extendable in that its length is reversibly adjustable allowing the user to increase and decrease the length of level 10 as may be needed for various uses. In general, to expand level 10, slidable body member 30 is moved along frame 12 away from fixed end 106 along longitudinal axis 100, and to retract/collapse level 10, slidable body member 30 is moved along frame 12 toward fixed end 106. In some embodiments, slidable body member 30 is sized such that its entire length fits between fixed end 106 and open end 104 of frame 12 when in the collapsed position.

Level 10 includes one or more level indicators, such as level vials 196 (e.g., bubble vials, spirit vials, etc.), which are supported by frame 12 in the appropriate orientation relative to surfaces 14 and/or 24 in order for the vials to indicate the angle, levelness, degree of plumb, etc. of the corresponding surface of a workpiece, as needed for a particular level design or level type.

Unlike a standard fixed length level with a single integral body that defines the working surfaces, one difficulty with expandable levels is the ability to maintain the coplanar nature of the working surfaces on opposing outer body portions, while at the same time providing a robust and easy to use extendable body design and locking/braking mechanism. As will be discussed in more detail below, the braking mechanism and/or frame designs discussed here are believed to address these potential design issues.

Referring to FIG. 1-6, level 10 includes a rear bushing 70 and a front bushing 110. In general, rear bushing 70 and front bushing 110 provide robust and low friction sliding contact surfaces. In addition, as discussed in more detail below, both rear bushing 70 and front bushing 110 include a spring or biasing structure that exert outwardly directed forces causing a high level of engagement and tight fit between body 12 and the slidable body member 30.

Rear bushing 70 is coupled to slidable body member 30 via fasteners 52 (e.g., screws) near enclosed end 36 of slidable body member 30. During the extension or retraction of slidable body member 30 along frame 12, spring 82 of rear bushing 70 slides along rear surface 22 of frame 12. Front bushing 110 is coupled to frame 12 via fasteners 52 (e.g., screws) near open end 104. During the extension or retraction of slidable body member 30 along frame 12, springs 114 of front bushing 110 slide along recessed internal vertical surface 40 of slidable body member 30. When slidable body member 30 is fully extended, stop surface 96 of rear bushing 70 engages with hard stop component 60 (best shown in FIG. 17) to prevent further extension of slidable body member 30 and thus defines the maximum extendable length of the level.

Figure 7:
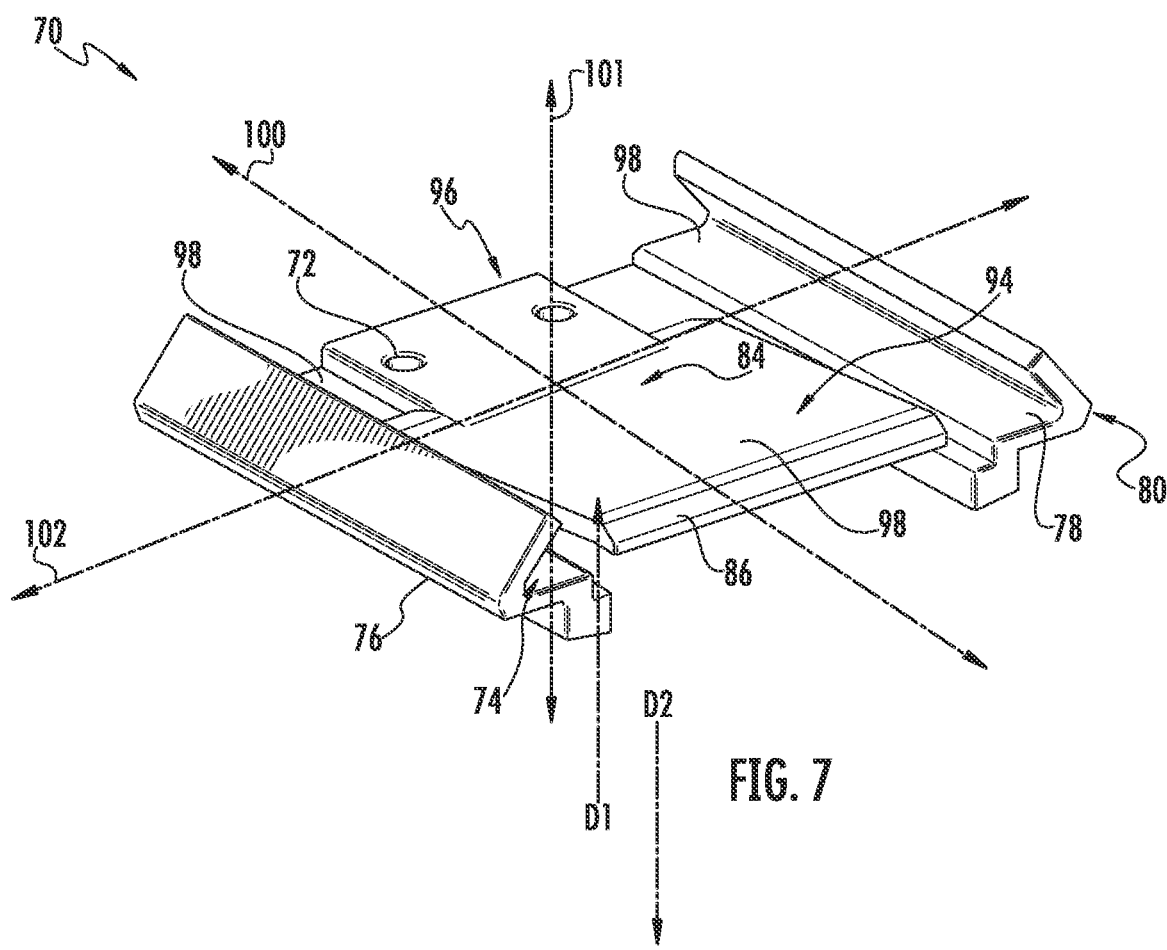
FIG. 7 is a perspective view of a rear bushing, according to an exemplary embodiment.
Figure 8:
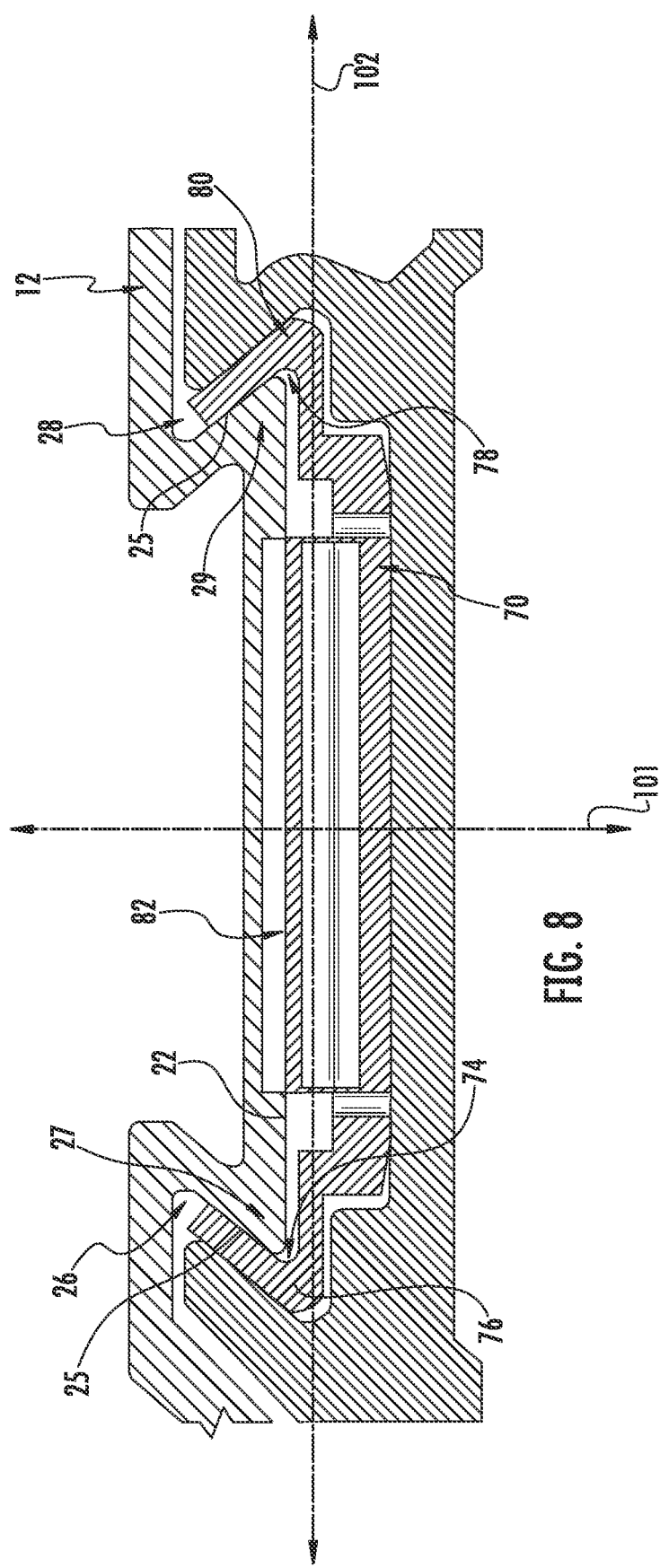
FIG. 8 is a cross-sectional view of a portion of a level comprising an extension, rear bushing and level frame, according to an exemplary embodiment.
Figure 9:
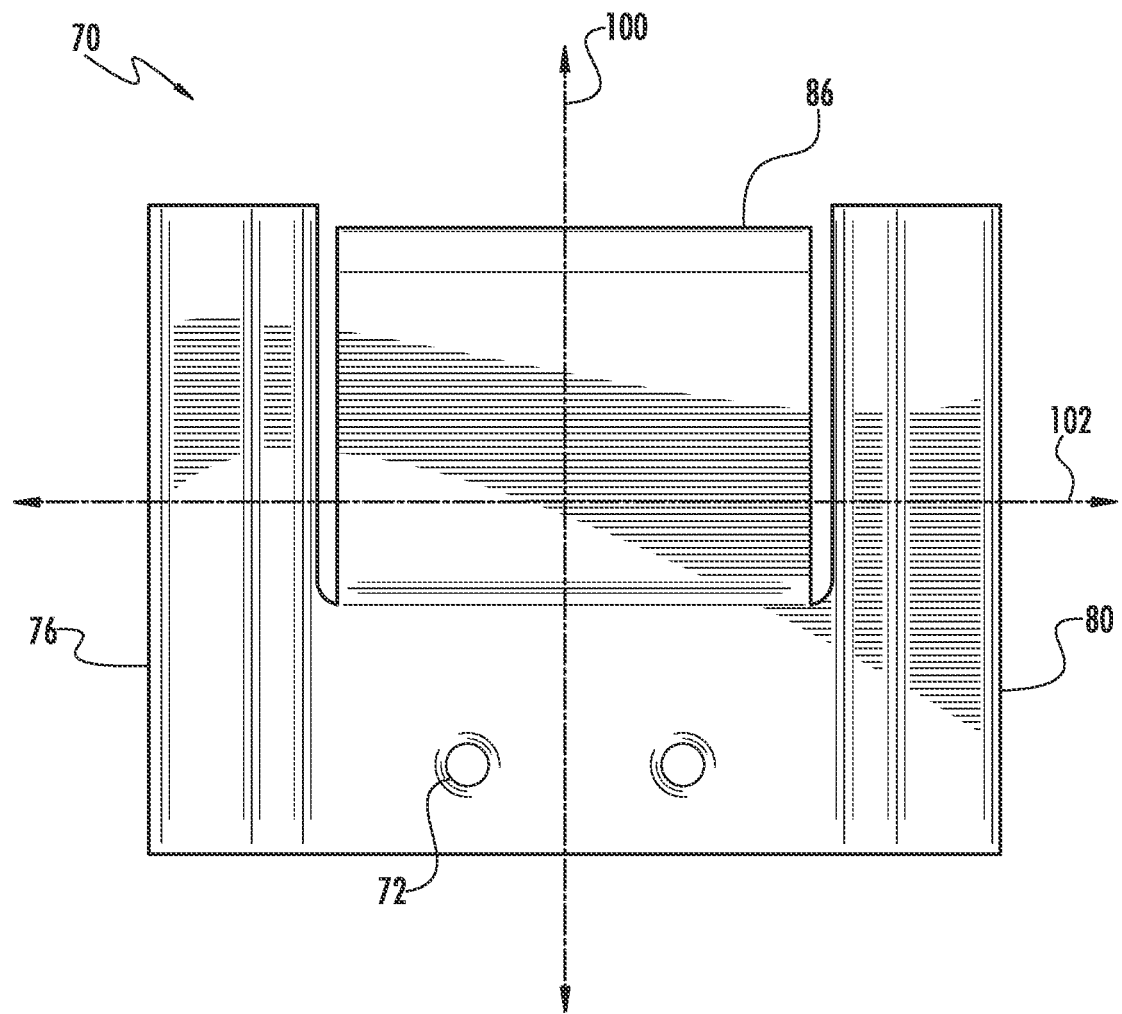
FIG. 9 is a bottom view of the rear bushing of FIG. 7.

Turning to FIGS. 7-9, rear bushing 70 is biased against and pushes level frame 12 by virtue of spring 82. In particular spring 82 pushes against rear surface 22 of frame 12 in direction D1, which results in flexing of end 86 of spring 82 deforming in direction D2. The force exerted by spring 82 results in rear bushing 70 being biased in direction D2 away from frame 12. As a result of that lateral force, rear bushing 70 maintains contact with frame 12 at internal angled surface 25 and slidable body member 30.

Slidable body member 30 and frame 12 are coupled together via a dovetail fit, which allows slidable body member 30 and frame 12 to slide with respect to each other along longitudinal axis 100. Upper longitudinal protrusion 27 of frame 12 is engaged within upper channel 48 of slidable body member 30, and lower longitudinal protrusion 29 of frame 12 is engaged within lower channel 50 of slidable body member 30. As a result, slidable body member 30 slides along longitudinal axis 100 by virtue of upper and lower longitudinal protrusions 27 and 29 of frame 12 engaging within upper and lower channels 48 and 50 of slidable body member 30 via a dovetail fit.

In general, level 10 comprises a frame 12 that comprises a base surface 16 and an opposing top surface 24. Slidable body member 30 of level 10 comprises extension bottom surface 18 and upper edge 31. Extension bottom surface 18 and frame bottom surface 16 are coplanar and collectively comprise base surface 14. Base surface 14 and top surface 24 are flat, planar surfaces that can be used to engage a surface of a workpiece to be measured using level 10. In some specific embodiments, base surface 14 and/or top surface 24 are machined to have a flat, flush or planar surface following formation of frame 12 (e.g., following extrusion of a metal forming frame 12), and in some embodiments, this machined surface may be anodized. Surfaces 14 and 24 may be referred to as working surfaces of level 10. Surfaces 14 and 24 are planar surfaces that are parallel to each other and are also parallel to a longitudinal axis 100 of level 10. In various embodiments, upper edge 31 of slidable body member 30 is embedded in the plane of top surface 24. In various other embodiments, upper edge 31 is slightly elevated above the plane of top surface 24.

Figure 10:
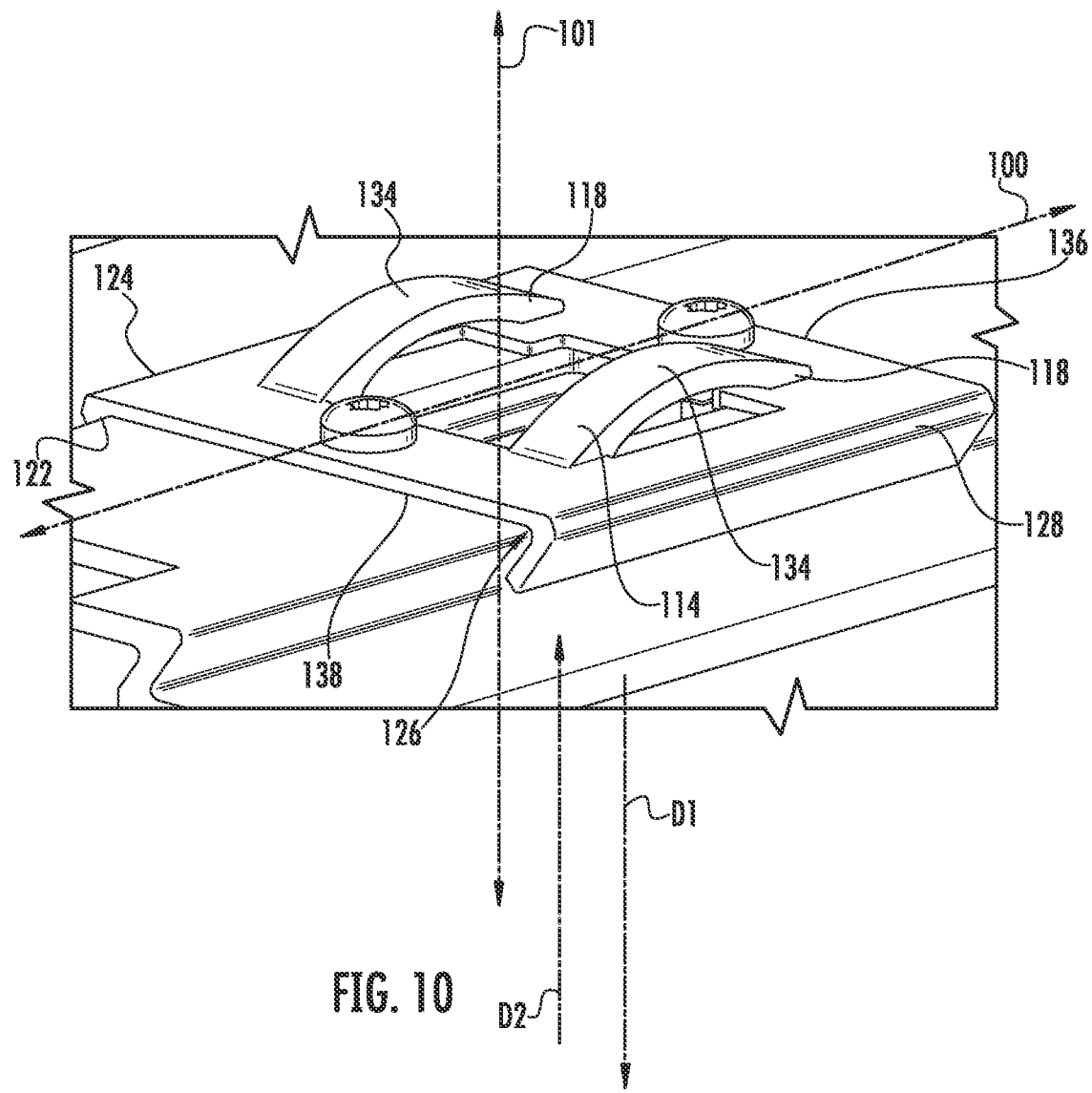
FIG. 10 is a perspective view of a front bushing coupled to a level frame, according to an exemplary embodiment.
Figure 11:
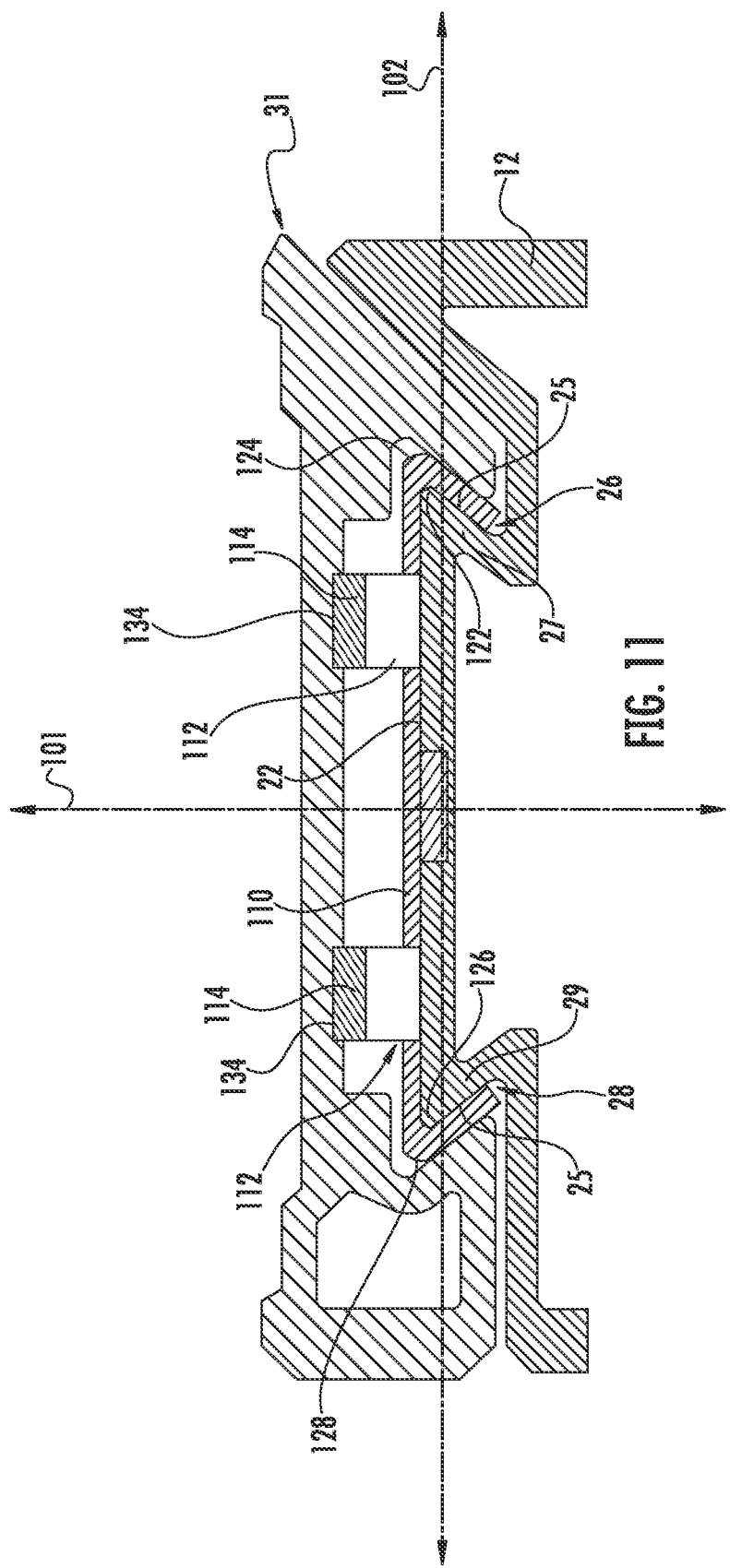
FIG. 11 is a cross-section view of a level, comprising a level frame and a front bushing, according to an exemplary embodiment.
Figure 12:
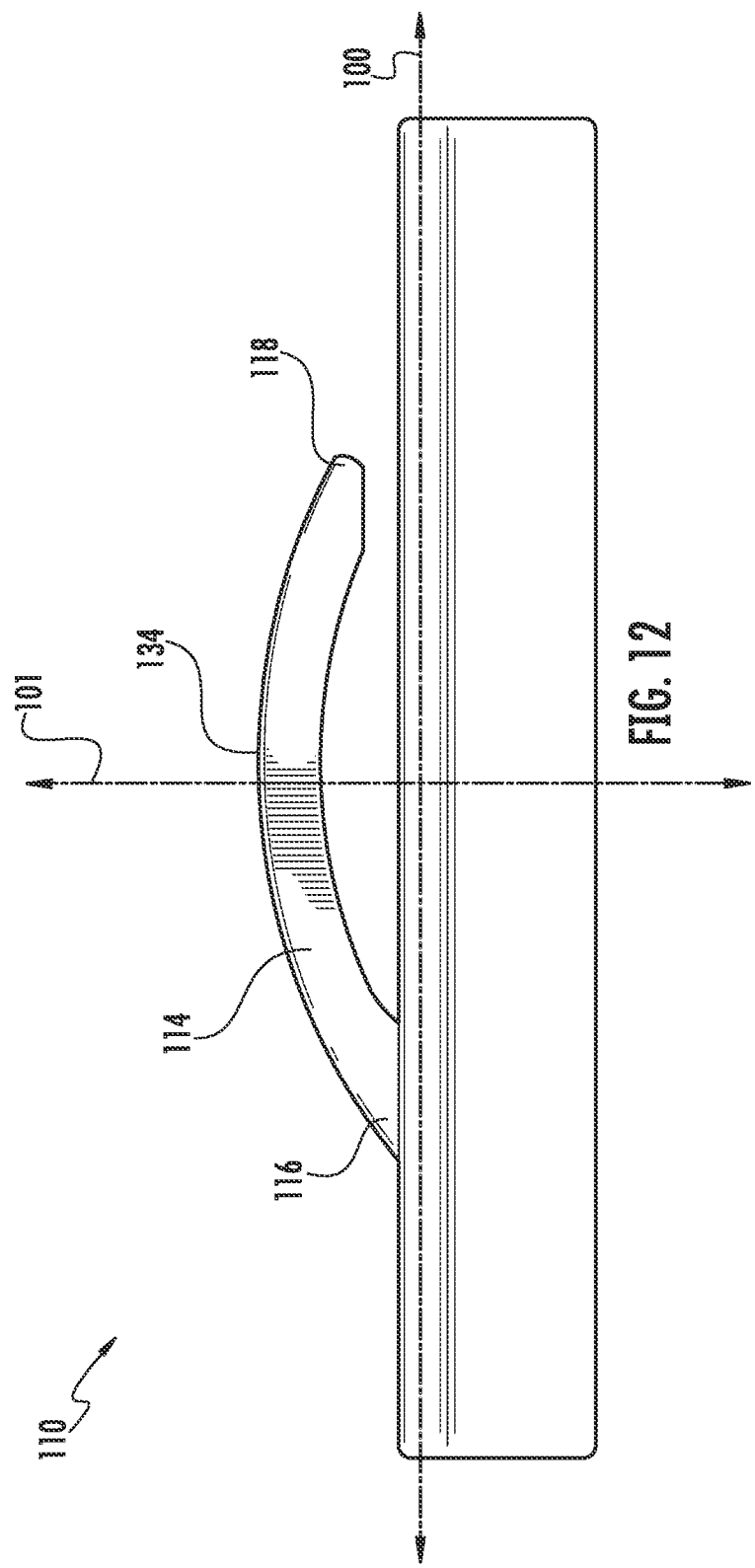
FIG. 12 is a top view of the front bushing of FIG. 10.

Turning to FIGS. 10-12, front bushing 110 is similarly biased against and pushes level frame 12 by virtue of springs 114. In particular springs 114 push recessed internal vertical surface 40 in direction D2, which results in flexing ends 118 of springs 114 deforming in direction D1. The force exerted by springs 114 results in front bushing 110 being biased in direction D1 away from slidable body member 30. Therefore, front bushing 110 maintains contact with frame 12 at internal angled surface 25.

Figure 13:
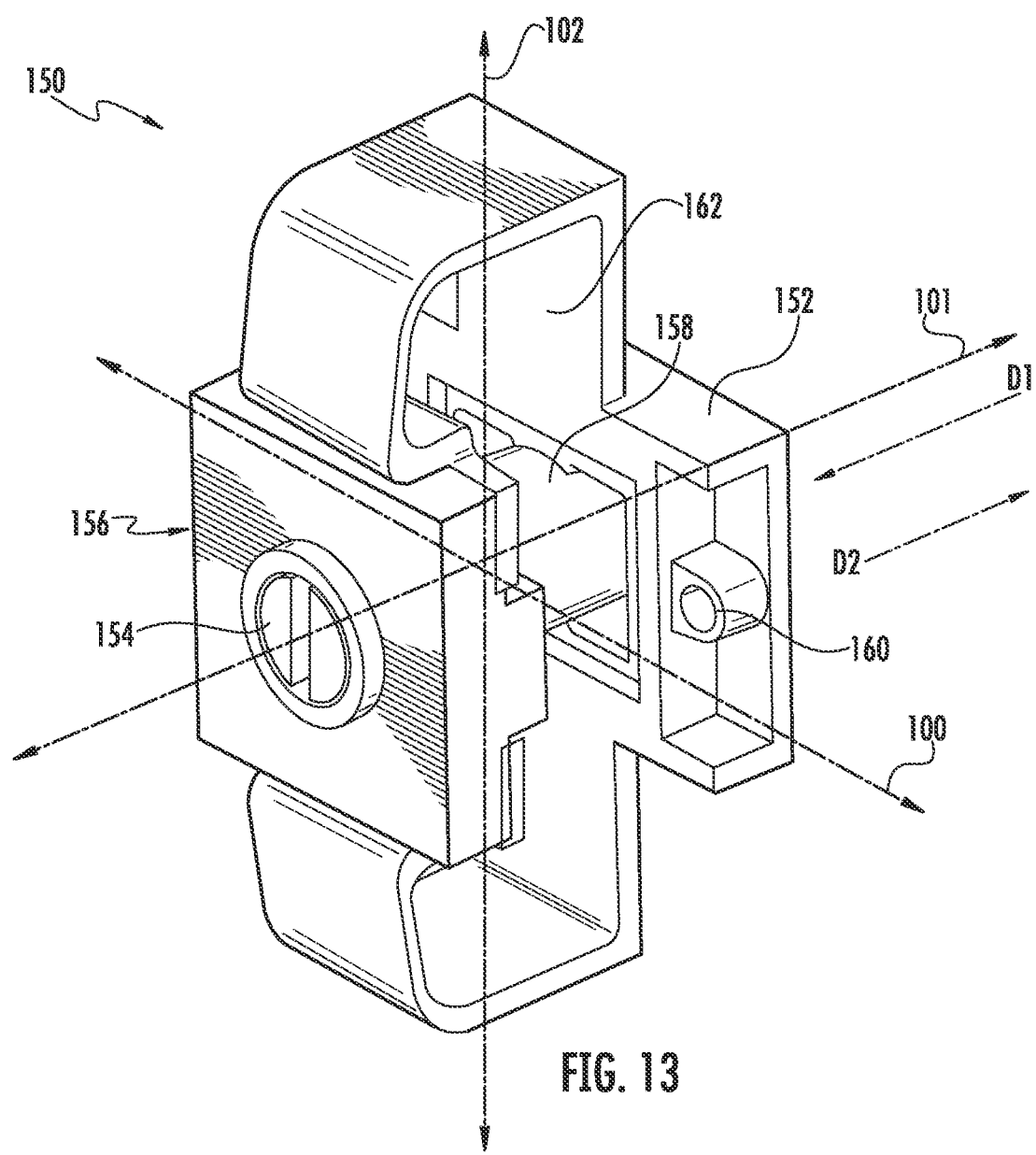
FIG. 13 is a perspective view of a braking mechanism, according to an exemplary embodiment.
Figure 14:
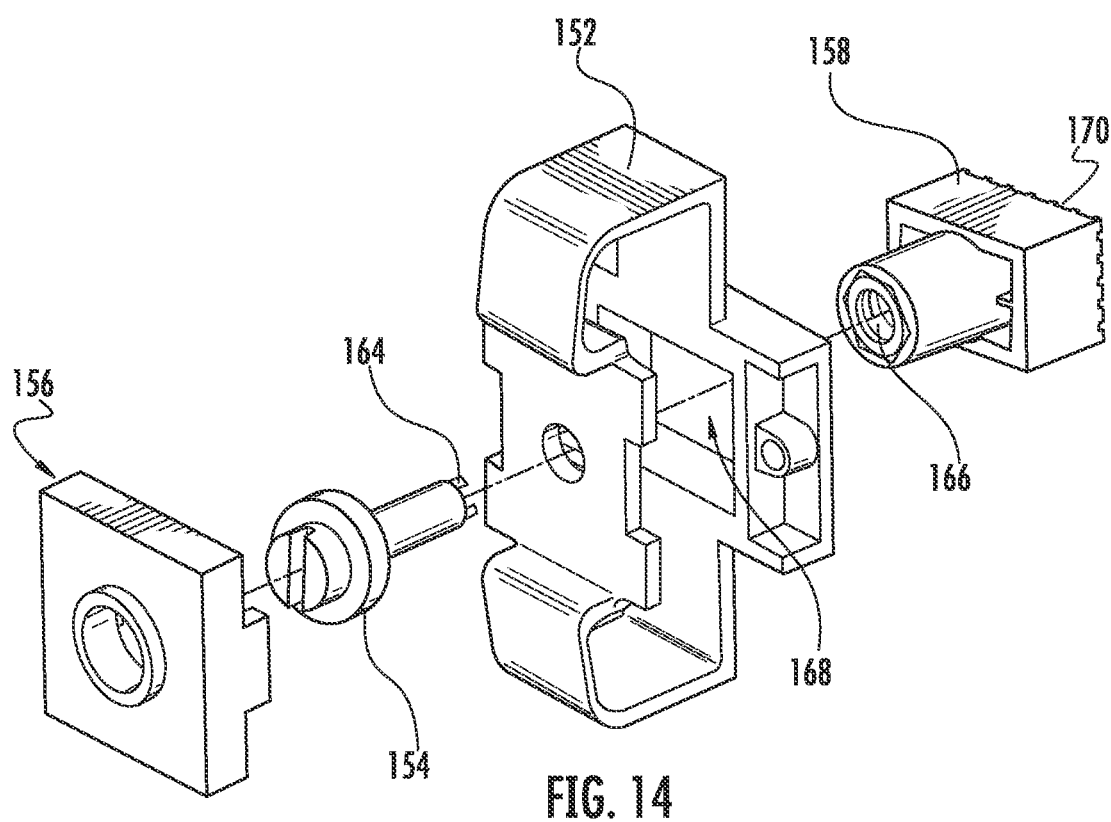
FIG. 14 is an exploded view of the braking mechanism of FIG. 13.
Figure 15:
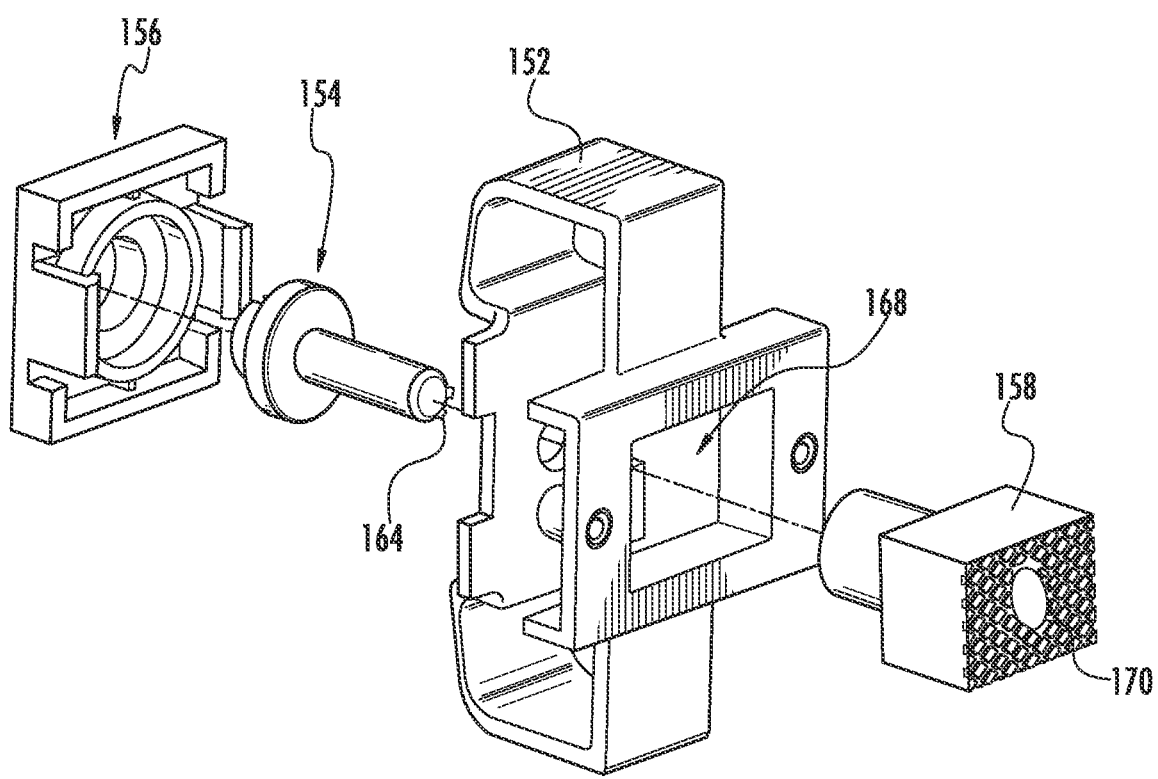
FIG. 15 is an exploded view of the braking mechanism of FIG. 13, viewed from another perspective.

Turning to FIGS. 13-15, braking mechanism 150 provides the user the ability to control the ease with which slidable body member 30 extends and retracts along level frame 12. In general, springs 82 and 114 are positioned to provide a constant but relatively low level of friction to control the sliding of slidable body member 30 relative to frame 12. When providing a low but non-zero level of friction, springs 82 and 114 increase the amount of force that must be applied in order to slide slidable body member 30 along frame 12. This constant friction decreases the chance of unintended movement of slidable body member 30. In specific embodiments, an adjustment control 154 (e.g., via a screw 154 or other mechanism) allows the user to adjust the amount of friction applied by braking mechanism 150 to slidable body member 30, which in turn allows the user to adjust how freely slidable body member 30 slides relative to frame 12.

Braking mechanism 150 may be adjusted to exert a biasing pressure against slidable body member 30 in direction D2. The increase in this frictional force between braking mechanism 150 and slidable body member 30 can be increased until the force required to move slidable body member 30 along longitudinal axis 100 is very large (and thus slidable body member 30 is effectively locked in position relative to frame 12).

Adjustable interface 154 comprises protrusions 164 that engage with thread 166 of brake 158. In various embodiments adjustable interface 154 is a custom-threaded bolt that matches the threads of nut 166. As adjustable interface 154 is rotated, protrusions 164 correspondingly rotate within helical thread 166, which causes brake 158 to move along lateral axis 101. In one embodiment, when adjustable interface 154 is rotated in a clockwise direction, from the perspective of FIG. 13, the engagement between protrusions 164 and thread 166 causes brake 158 to move in direction D2 towards front bushing 110. As a result, engagement surface 170 of brake 158 moves towards front bushing 110, and thereby increases the compressive force exerted between springs 114 and slidable body member 30. When adjustable interface 154 is rotated in a counter-clockwise direction, from the perspective of FIG. 13, the engagement between protrusions 164 and thread 166 causes brake 158 to move in direction D1 away from front bushing 110. As a result, the compressive force exerted between springs 114 and slidable body member 30 is reduced, and less force is required to move slidable body member 30 along longitudinal axis 100.

Figure 16:
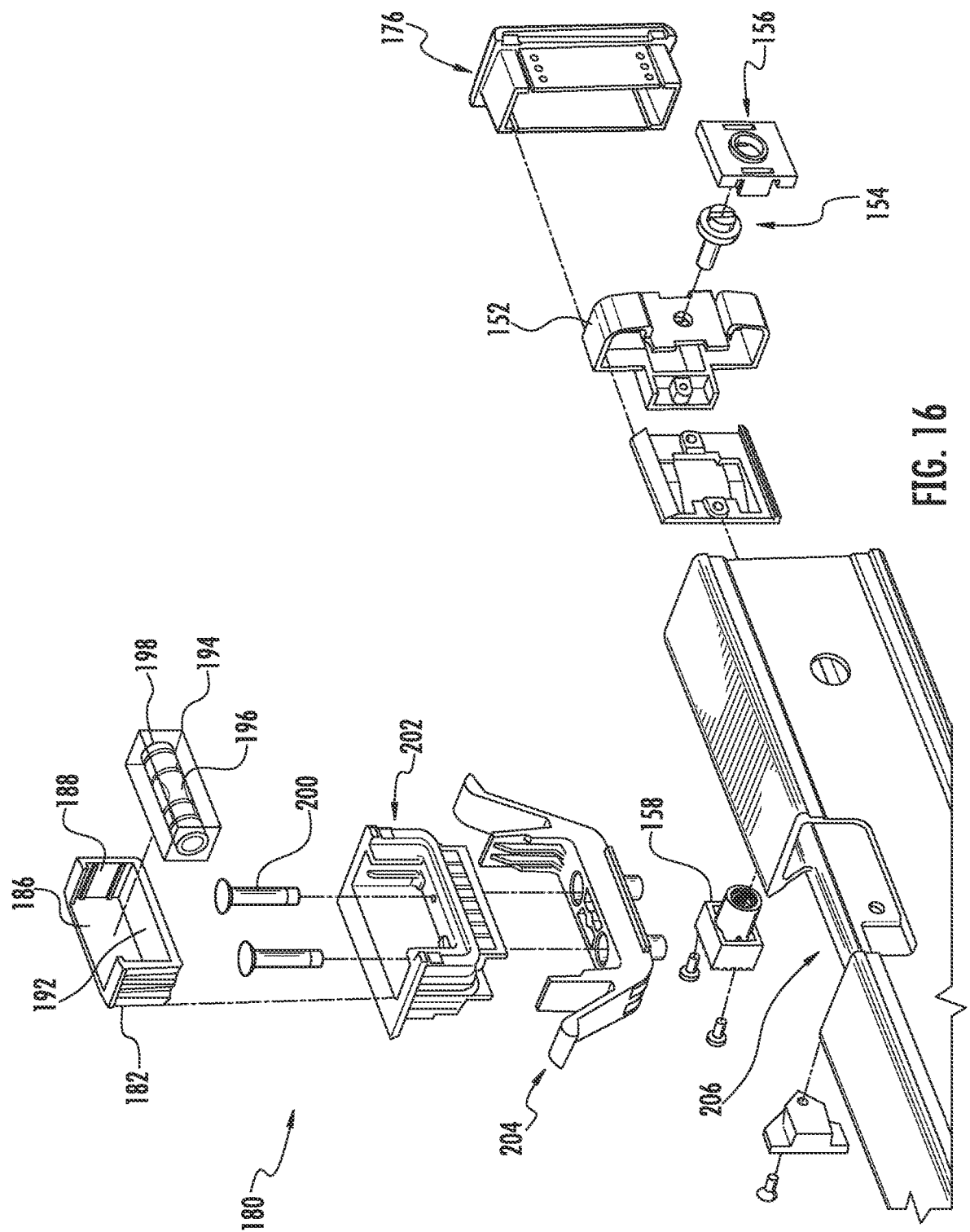
FIG. 16 is an exploded view of a level, including a vial component, an extension restricting component and a front bushing, according to an exemplary embodiment.
Figure 17:
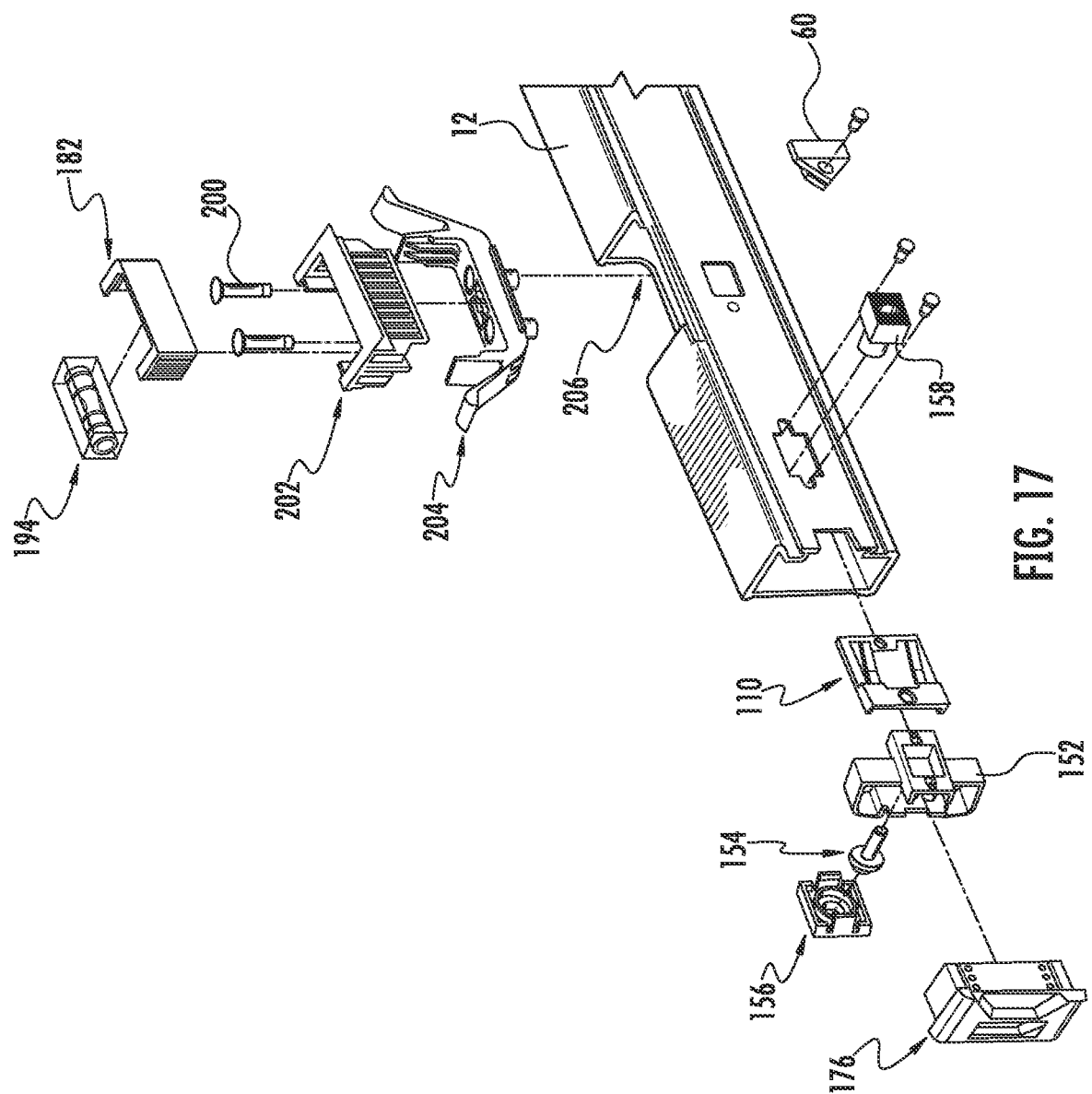
FIG. 17 is an exploded view of the level of FIG. 16, viewed from another perspective.

Turning to FIGS. 16-17, level 10 comprises one or more orientation measuring components 180, for example vials 196. As will be explained below, orientation measuring component 180 provides a visual backdrop for vials 196 that allows vials 196 to be more easily read and interpreted. Bracket 204 is secured within chamber 206 in level frame 12. Mount 202 is placed within bracket 204 and secured via fasteners 200. Vial frame 194 is placed in mount 202, and vial 196 is mounted within vial frame 194. In one embodiment, back surface 186, sidewall surface 188 and bottom surface 192 of vial frame 194 are a contrasting color to a liquid within vial 196. For example, in FIG. 16 surfaces 186, 188 and 192 are relatively light (e.g., light grey, white, off-white) while the liquid in vial 196 is blue. In this example, the bubble within vial 196 is clearly visible compared to the blue liquid against the backdrop of surfaces 186, 188 and 192.

As noted above, when slidable body member 30 is fully extended, stop surface 96 of rear bushing 70 engages with hard stop component 60 to prevent further extension of slidable body member 30 and thus defines the maximum extendable length of the level. In various embodiments hard stop component 60 is mounted to one of frame 12 and slidable body member 30.

Figure 18:
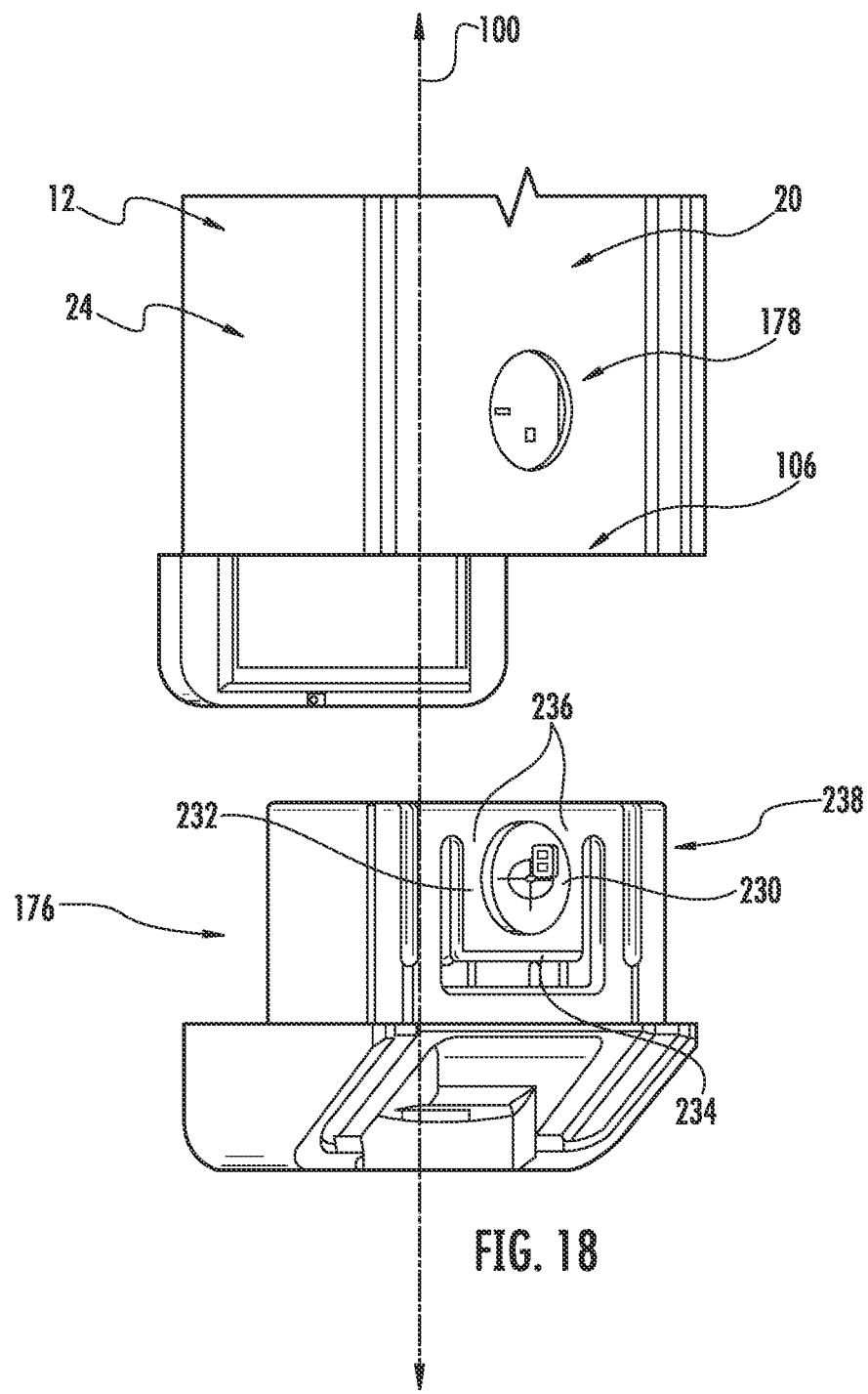
FIG. 18 is a detailed schematic perspective view of a level including an end cap, according to an exemplary embodiment.

Turning to FIG. 18, when end cap 176 is removably coupled to fixed end 106 of frame 12, internal member 238 of end cap 176 is slid within frame 12. Engagement protrusion 230 presses against an internal surface of frame 12 and deforms engagement pivot 232 as pivot end 234 is partially rotated around pivot base 236. When engagement protrusions 230 aligns with opening 178, engagement protrusion 230 engages with opening 178, thereby coupling end cap 176 and frame 12. To remove, engagement protrusion 230 nearest pivot end 234 is pressed to de-couple engagement protrusion 230 from opening 178.

Figure 19:
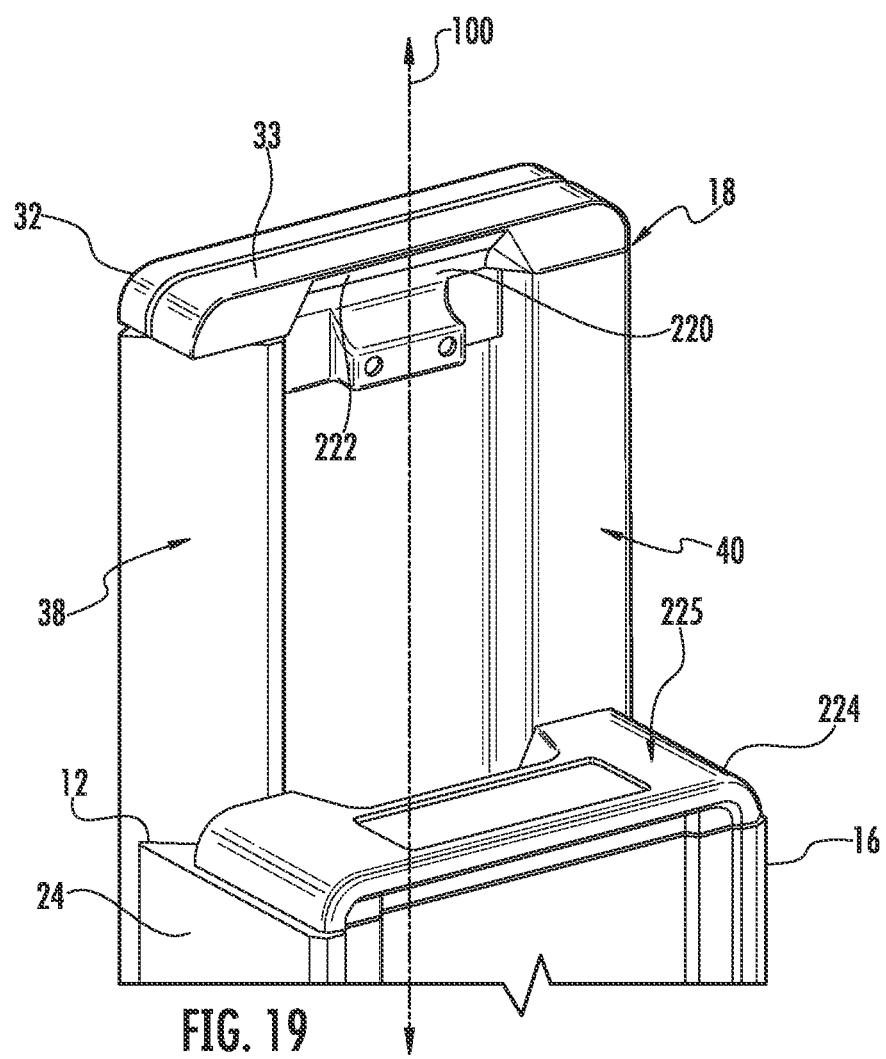
FIG. 19 is a detailed schematic perspective view of a level and an extension, according to an exemplary embodiment.

Turning to FIG. 19, to facilitate the extension of slidable body member 30, extension end cap 32 includes a cavity, such as recess 220 behind back surface 222 of extension end cap 32. A user may find gripping purchase with recess 220, thus providing enough frictional engagement between the user and extension end cap 32 to allow slidable body member 30 to be axially moved with respect to frame 12.

Figure 20:
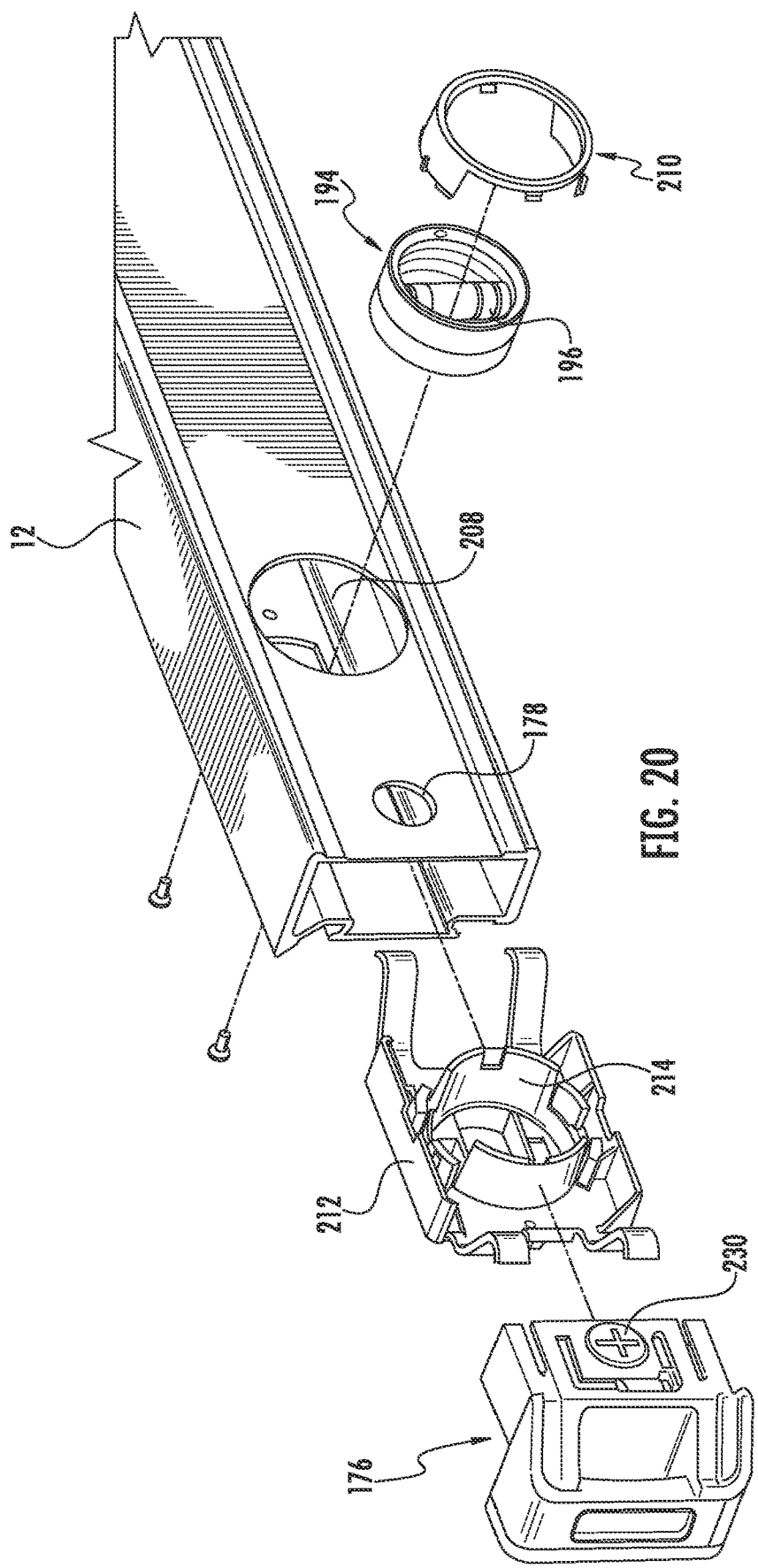
FIG. 20 is an exploded view of a level, including a vial component and an end cap, according to an exemplary embodiment.
Figure 21:
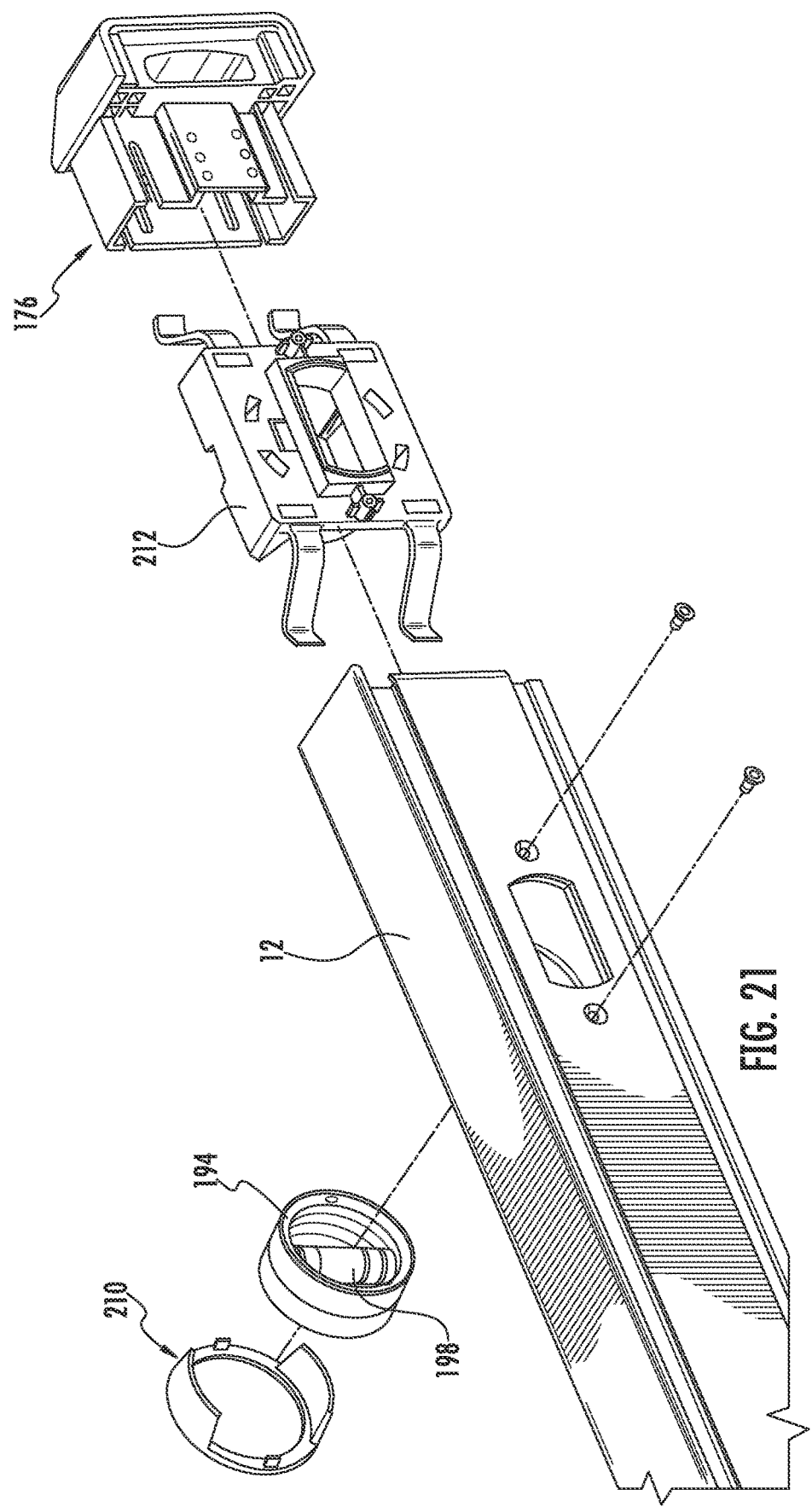
FIG. 21 is an exploded view of the level of FIG. 20, viewed from another perspective.
Figure 22:
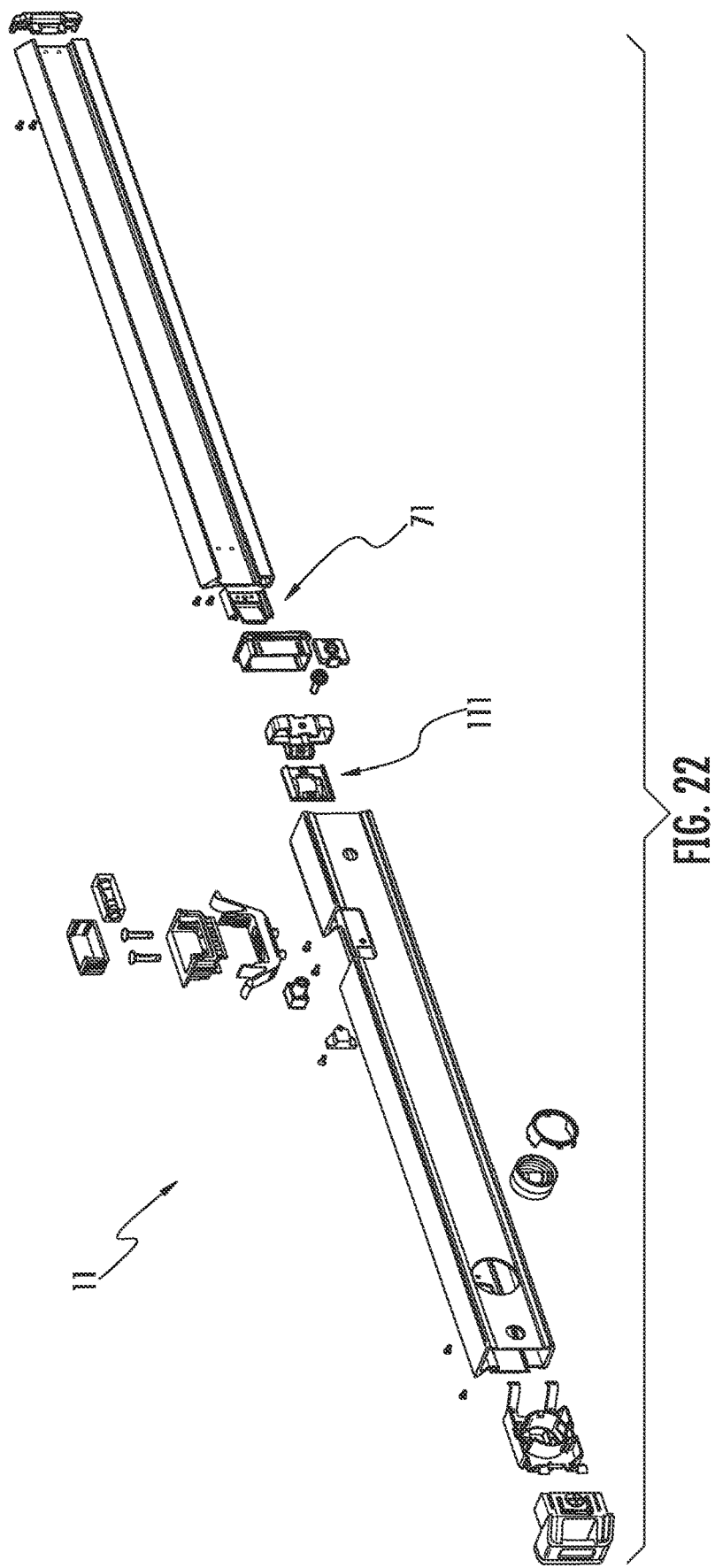
FIG. 22 is an exploded perspective view of a level according to an exemplary embodiment.
Figure 23:
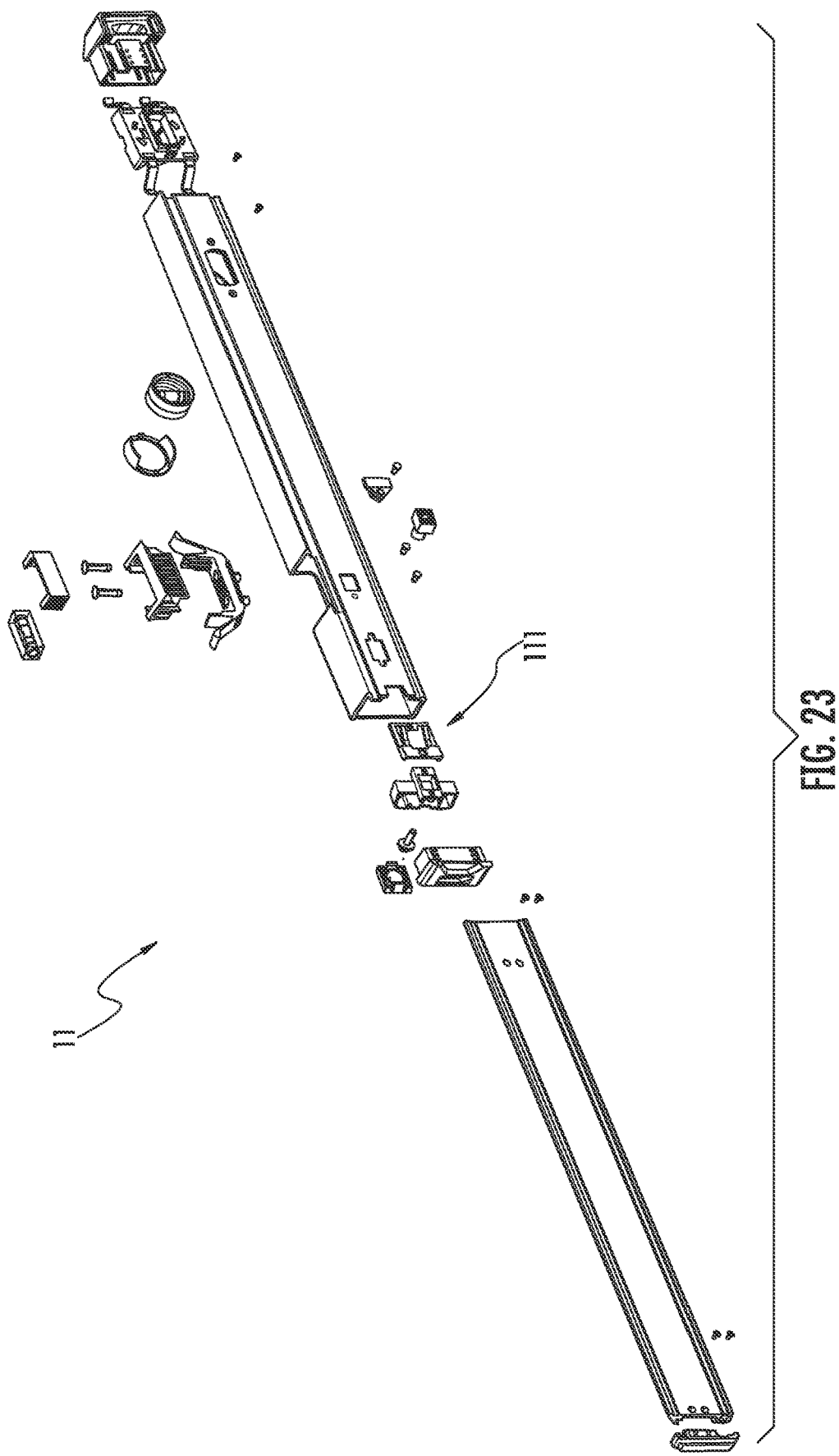
FIG. 23 is an exploded perspective view of the level of FIG. 22, viewed from another perspective.
Figure 24:
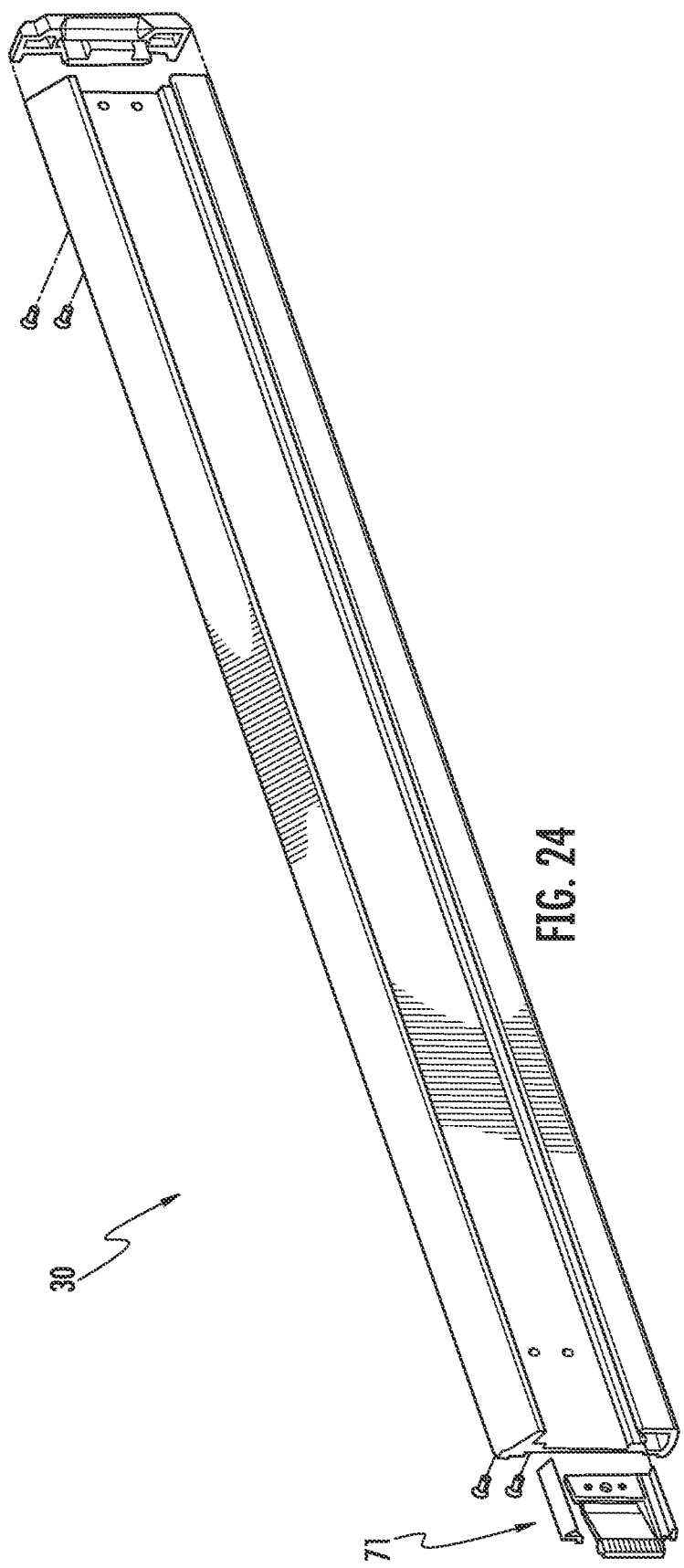
FIG. 24 is a perspective view of an extension piece including a rear bushing, according to an exemplary embodiment.
Figure 25:
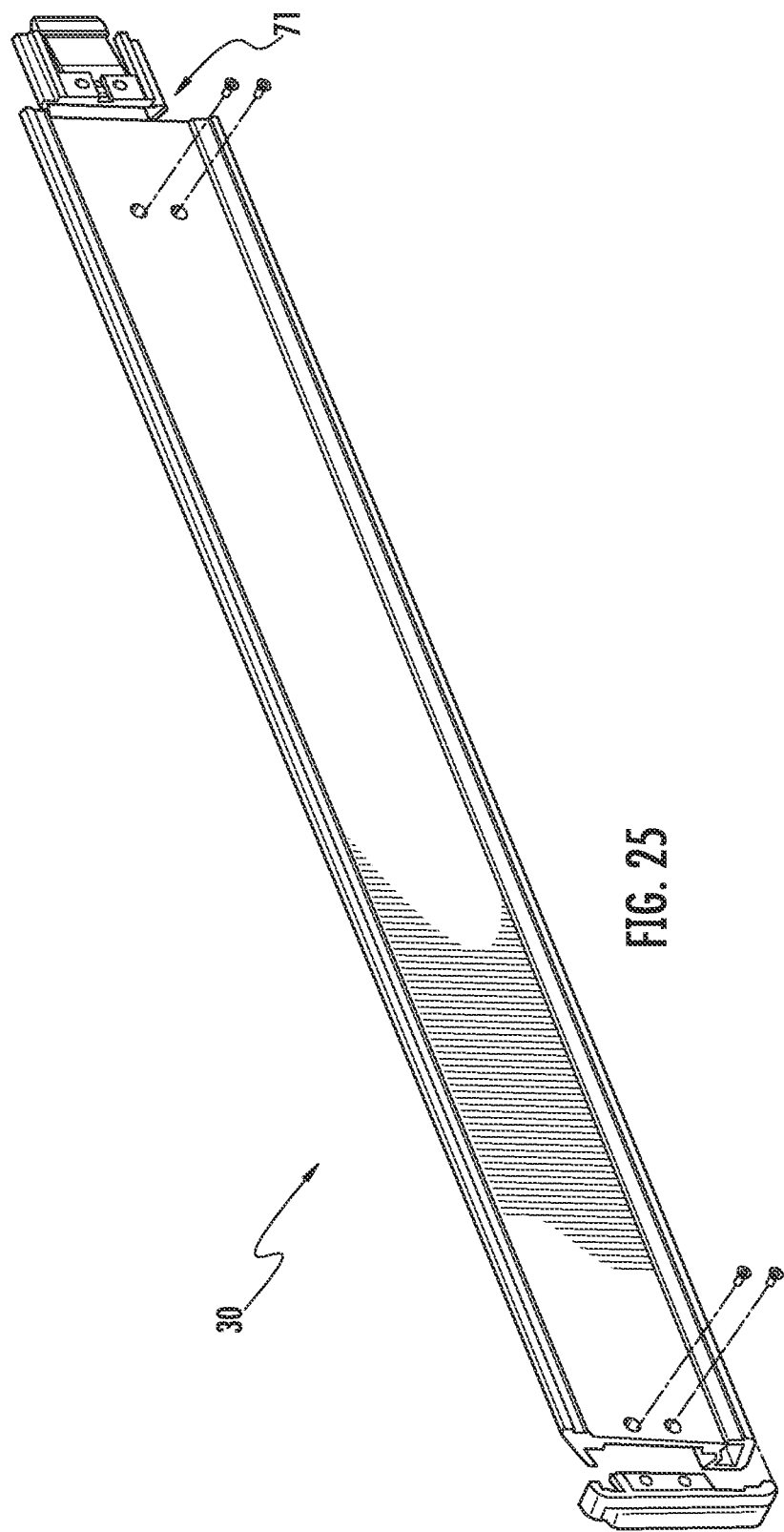
FIG. 25 is a perspective view of the extension piece of FIG. 24, viewed from another perspective.

Turning to FIGS. 20-21, vial frame 194 is placed within bracket 212 and then mount 210 is attached. Bracket 212 is secured within chamber 208 of level frame 12. Subsequent to bracket 212 being secured within chamber 208 of frame 12, end cap 176 is inserted into frame 12. As before, in various embodiments sidewall surface 214 are a contrasting color to (e.g., light grey, white, off-white) a liquid within vial 196, which is blue. In this example, the bubble within vial 196 is clearly visible compared to the blue liquid against sidewall surface 214.

In specific embodiments, the level body components (such as frame 12 and slidable body member 30) discussed herein are each formed from a hollow piece of material, such as hollow pieces of metal material (e.g., hollow pieces of extruded aluminum). Further, it should be understood that the terms vertical and horizontal used herein refer to reference axes where horizontal is a plane that lies parallel to the working surfaces of the level and vertical is a plane that lies perpendicular to the working surfaces of the level.

In specific embodiments, one or more components of level 10, such as bushings 70 and 110 and braking mechanism 150, are formed from a low wear, relatively low friction and/or durable polymer material, such a polyoxymethylene polymer material, like Delrin available from DuPont. Further to facilitate fine adjustments of the amount of friction applied by braking mechanism 150, brake 158 may have low pitch threading such that each rotation of screw 154 translates to a small adjustment in the vertical position change of brake 158.

The expanding levels discussed herein comprises one or more bushing structures located between frame 12 and slidable body member 30. In such embodiments, the bushing structures may provide for improved sliding via controlled friction and/or wear resistance as compared to an arrangement in which frame 12 directly engages slidable body member 30.

In various embodiments, front bushing 110 and rear bushing 70 comprise a low friction, low wear polymer material providing bushing functionality between frame 12 and slidable body member 30, facilitating sliding of slidable body member 30 relative to frame 12.

Figure 26:
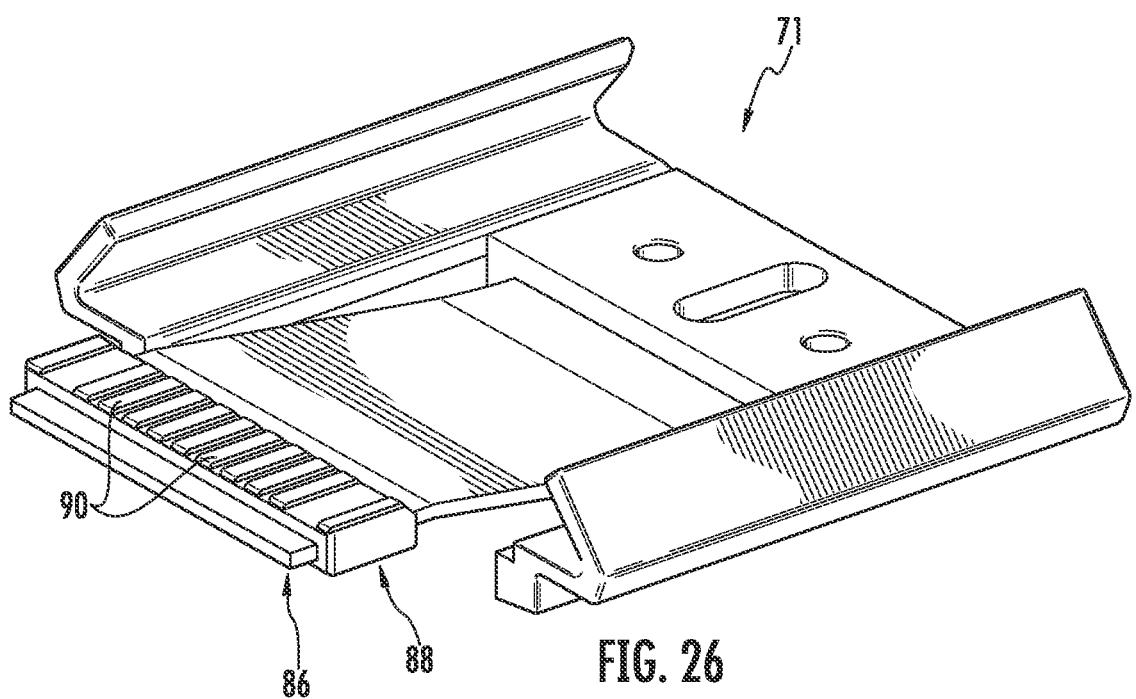
FIG. 26 is a perspective view of a rear bushing, according to an exemplary embodiment.
Figure 29:
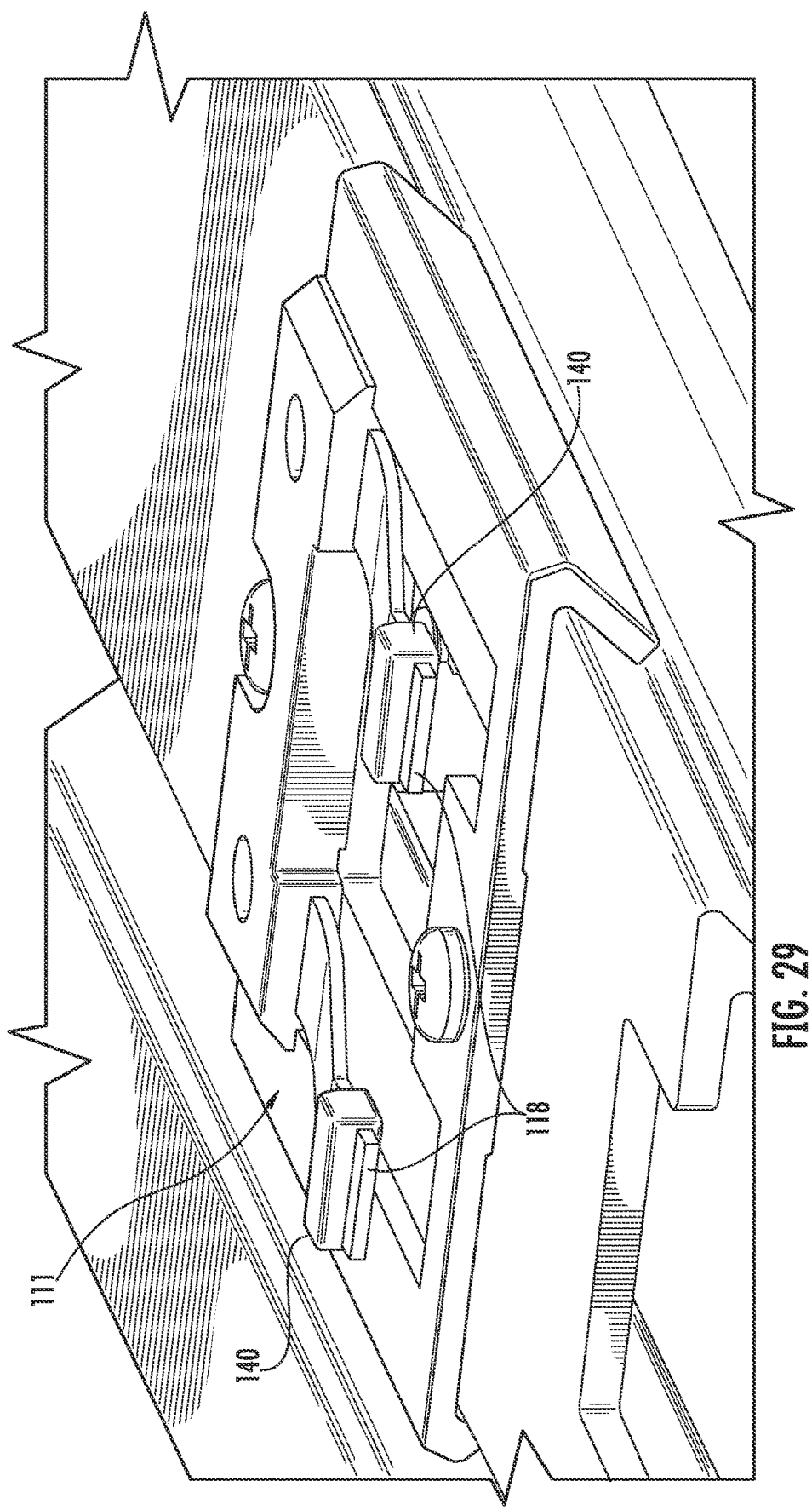
FIG. 29 is a perspective view of a front bushing coupled to a level frame, according to an exemplary embodiment.

Referring to FIG. 22-25, level 11 is shown according to an exemplary embodiment. Level 11 is substantially the same as level 10, except as disclosed and illustrated herein. Level 10 comprises rear bushing 71 and front bushing 111, which are illustrated in FIGS. 29 and 26, respectively. Rear bushing 71 and front bushing 111 are substantially the same as rear bushing 70 and front bushing 110, respectively, except as disclosed and illustrated herein.

Figure 27:
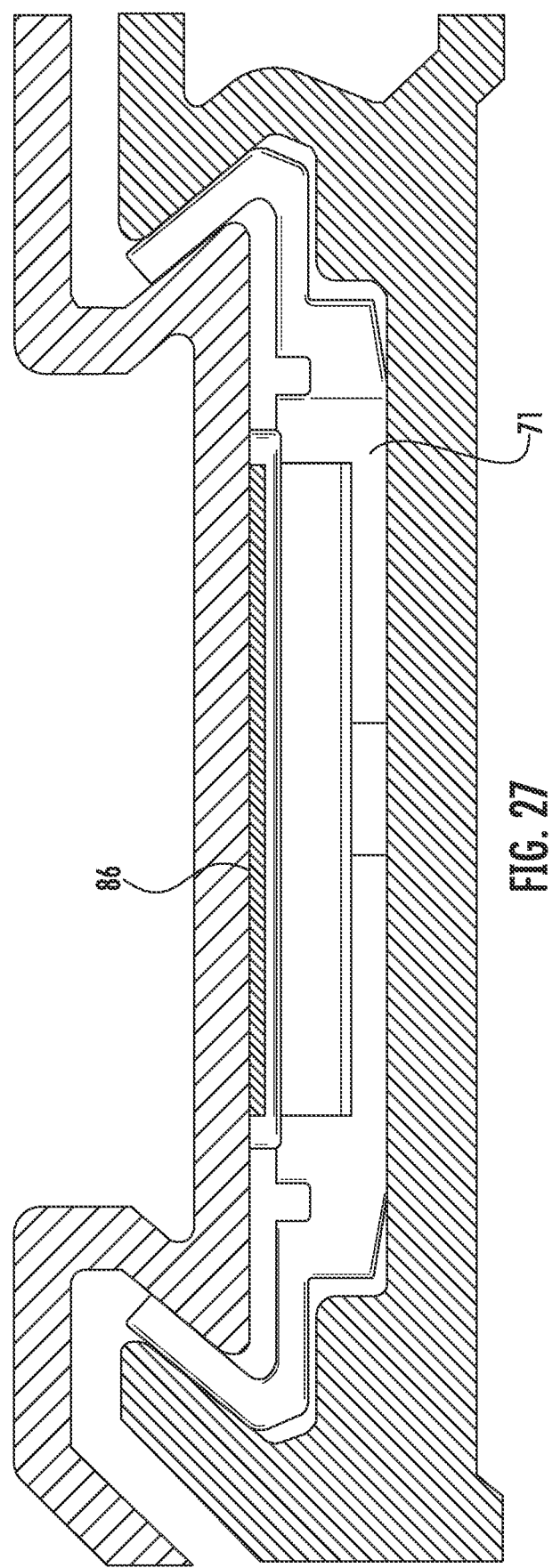
FIG. 27 is a cross-sectional view of a portion of a level comprising an extension, rear bushing and level frame, according to an exemplary embodiment.
Figure 28:
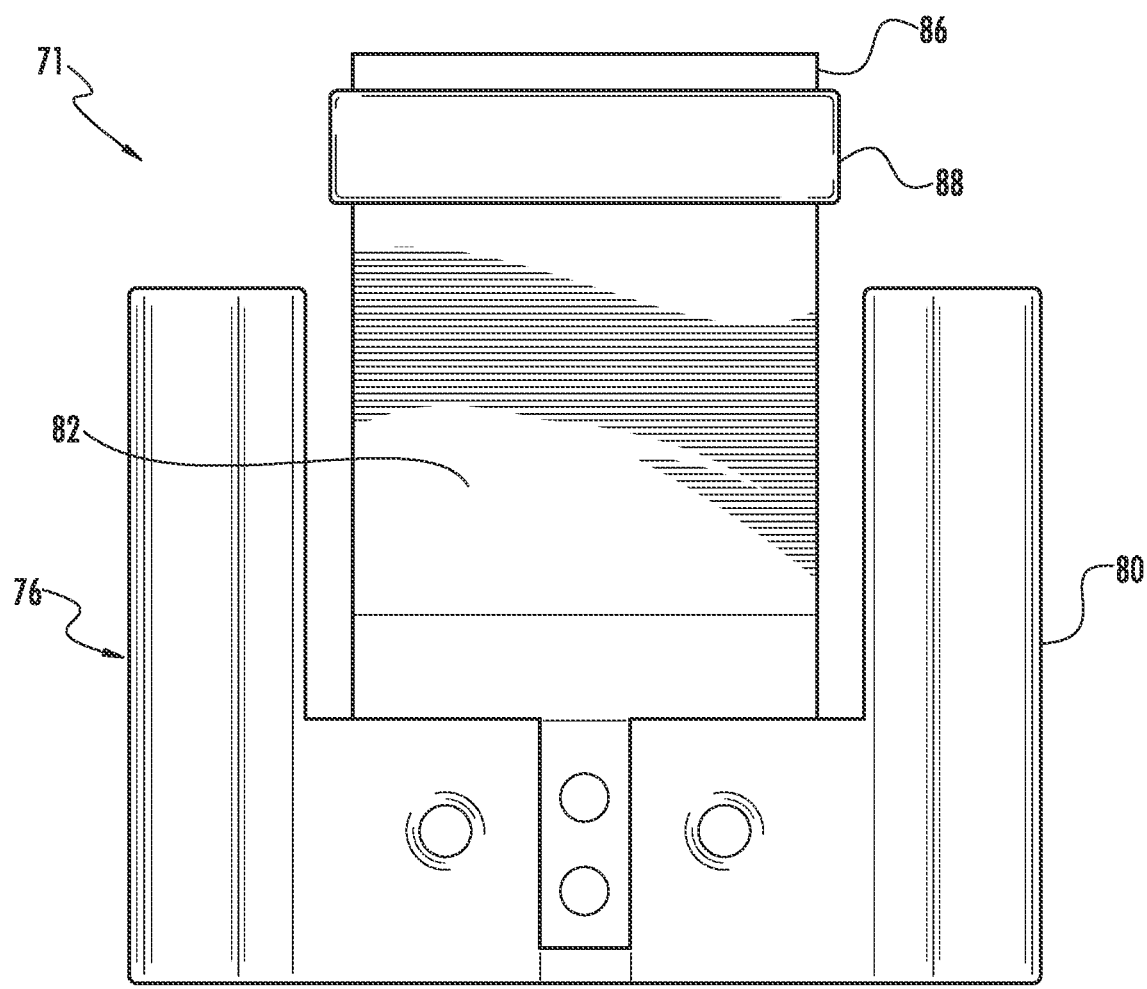
FIG. 28 is a bottom view of the rear bushing of FIG. 26.

Referring to FIGS. 26-28, rear bushing 71 is shown according to an exemplary embodiment. Rear bushing 71 is substantially the same as rear bushing 70, except as disclosed and illustrated herein. Rear bushing 71 comprises engagement component 88 having ribs 90. Rear bushing 71 is coupled to slidable body member 30. During extension or retraction of slidable body member 30 along frame 12, engagement component 88 generally, and ribs 90 specifically, engage against frame 12. In various embodiments engagement component 88 generally and ribs 90 specifically are configured to provide a reduced and/or minimized resistance when sliding against frame 12. In various embodiments, spring 82 in rear bushing 71 extends further than upper protrusion 76 and lower protrusion 80 (best shown in FIG. 28).

Figure 30:
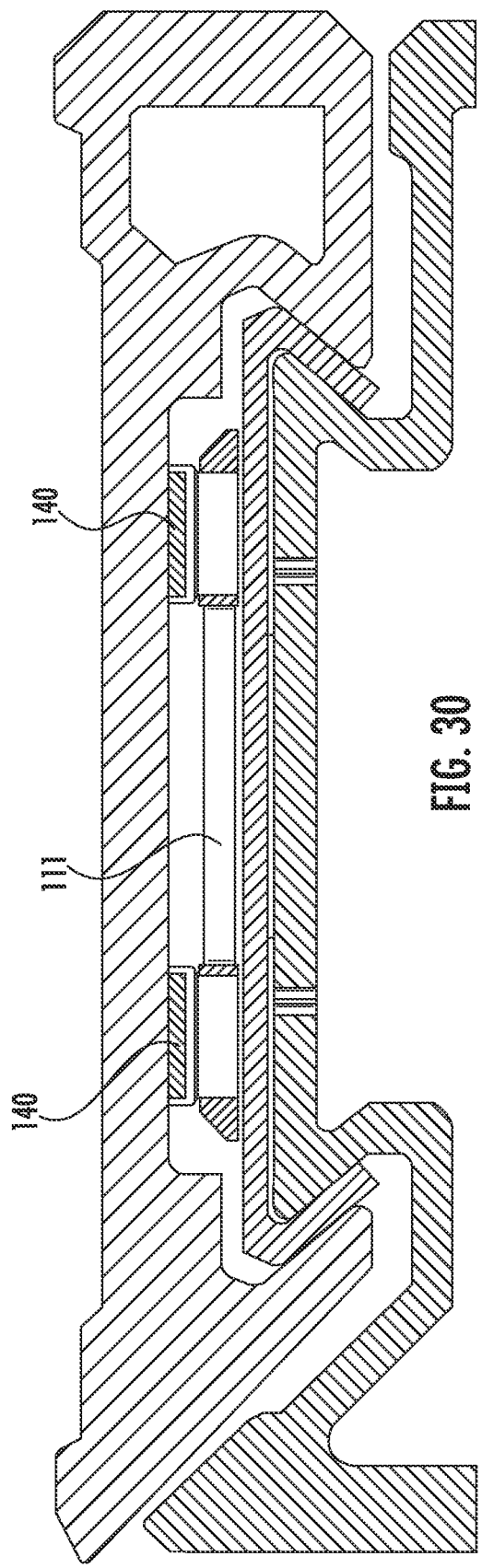
FIG. 30 is a cross-section view of a level, comprising a level frame and a front bushing, according to an exemplary embodiment.
Figure 31:
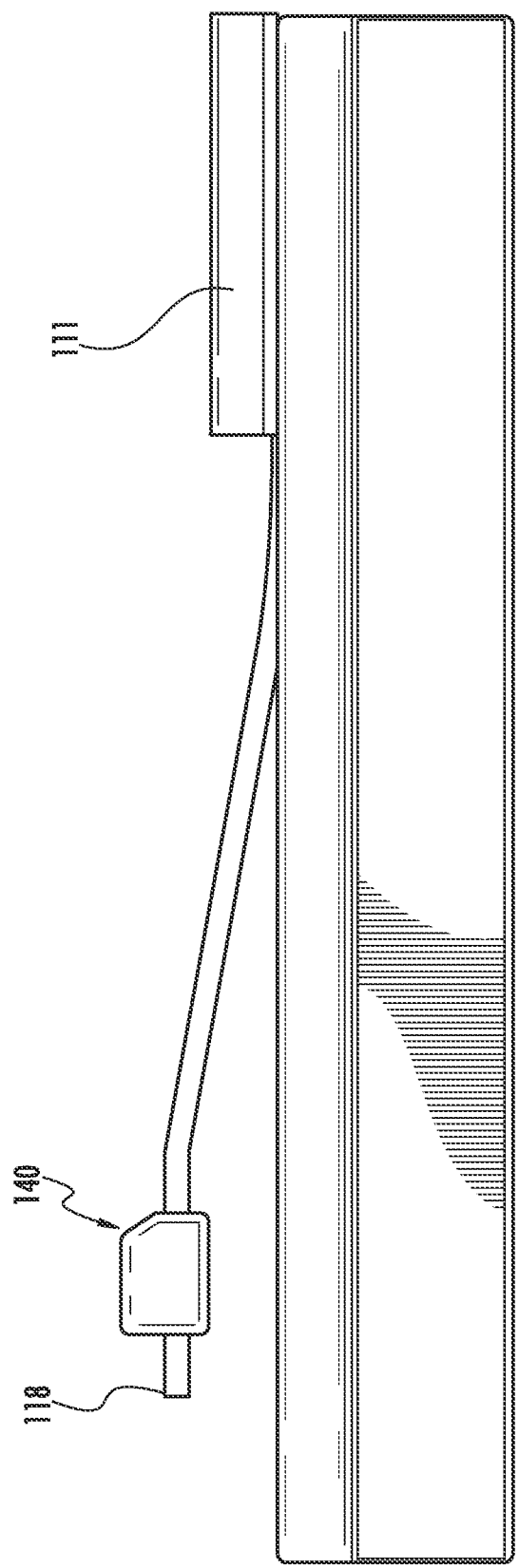
FIG. 31 is a top view of the front bushing of FIG. 29.

Referring to FIGS. 29-31, front bushing 111 is shown according to an exemplary embodiment. Front bushing 111 is substantially the same as front bushing 110, except as disclosed and illustrated herein. Front bushing 111 comprises engagement component 140. Front bushing 111 is coupled to frame 12. During extension or retraction of slidable body 30 along frame 12, engagement component 140 engages against slidable body member 30. Springs 114 in front bushing 111 extend laterally and/or upwards towards slidable body member 30, whereas springs 114 in front bushing 110 are arcuate shaped (best shown in FIGS. 10 and 12), and initially extend towards slidable body member 30 and later extend away from slidable body member 30. In various embodiments engagement component 140 generally is configured to provide a reduced and/or minimized resistance when sliding against slidable body member 30.

Figure 32:
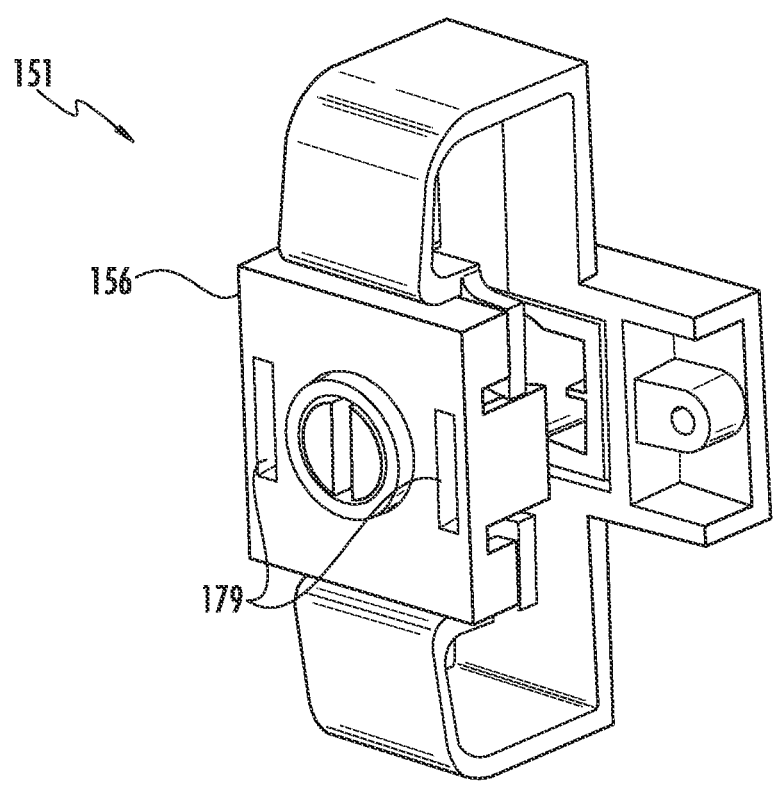
FIG. 32 is a perspective view of a braking mechanism, according to an exemplary embodiment.
Figure 33:
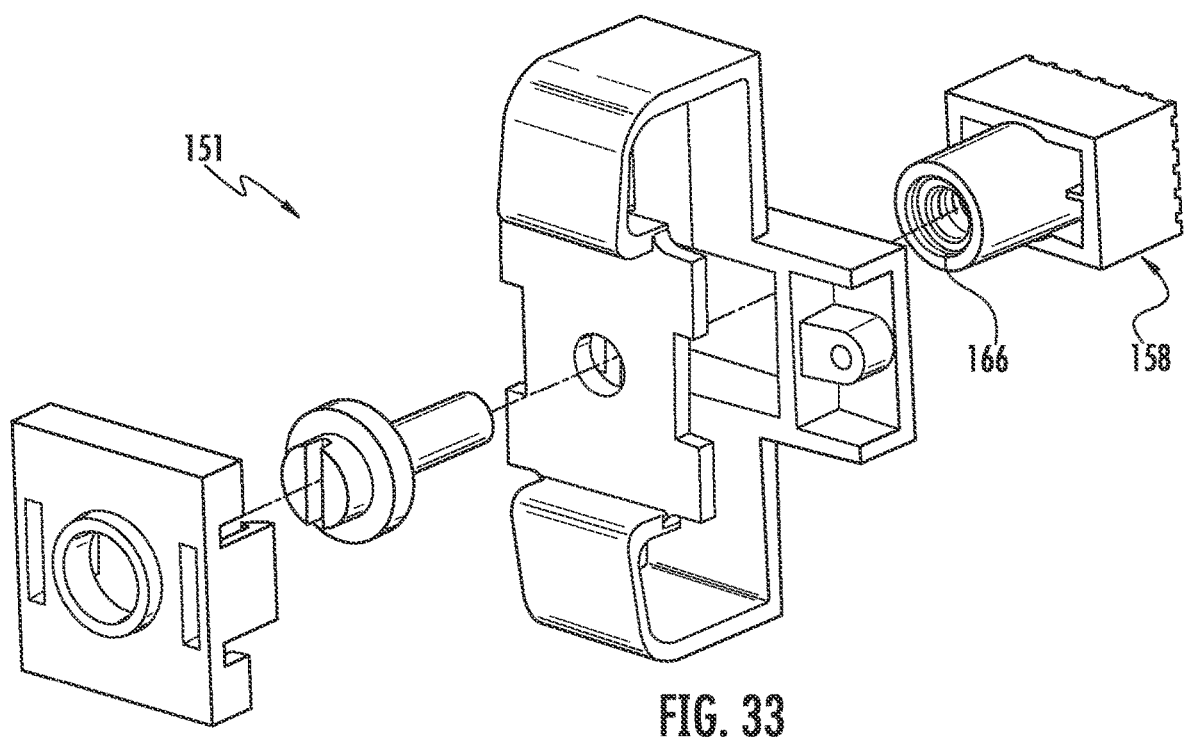
FIG. 33 is an exploded view of the braking mechanism of FIG. 32.
Figure 34:
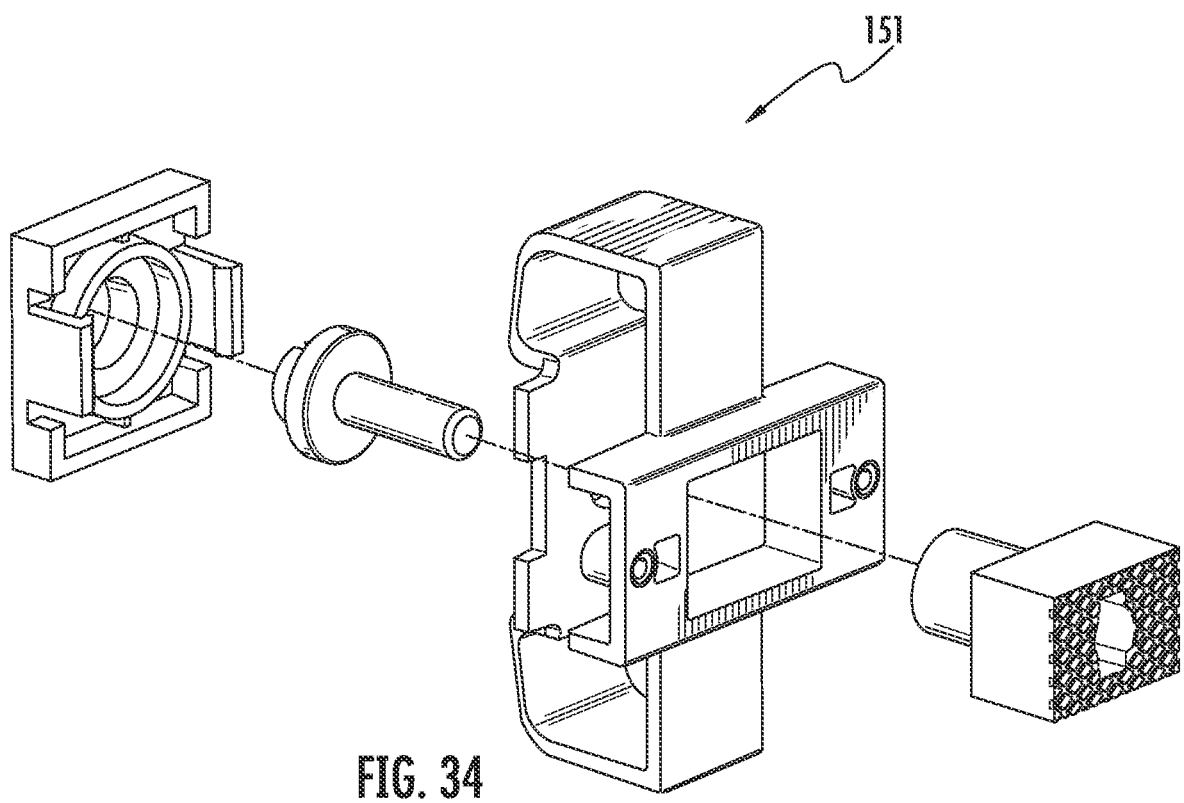
FIG. 34 is an exploded view of the braking mechanism of FIG. 32, viewed from another perspective.

Referring to FIGS. 32-34, braking mechanism 151 is shown according to an exemplary embodiment. Braking mechanism 151 is substantially the same as braking mechanism 150, except as disclosed and illustrated herein. Tightener bracket 156 includes apertures 179 on the surface facing away from brake 158. In various embodiments of braking mechanism 151, thread 166 in brake 158 is molded within brake 158.

Figure 35:
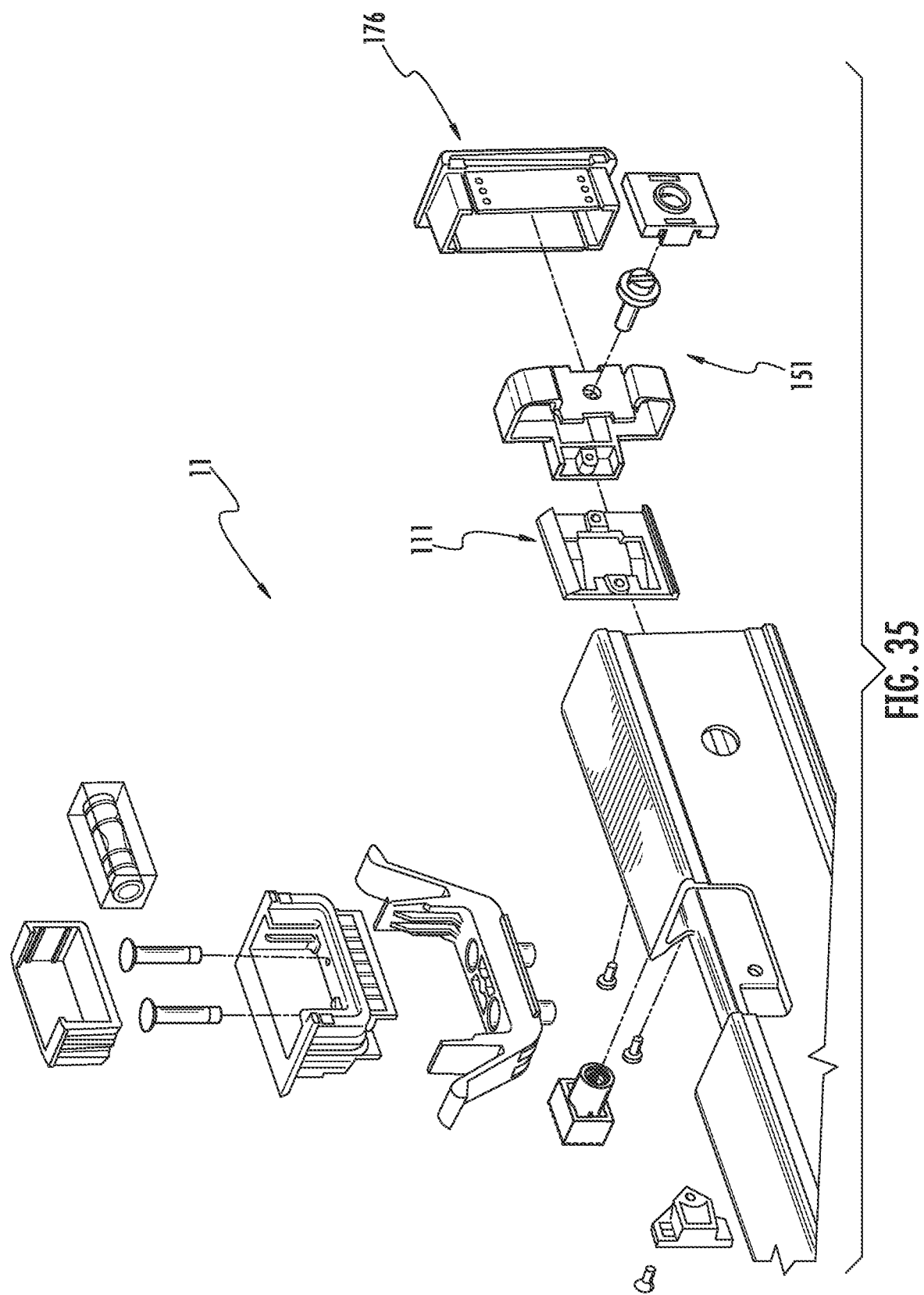
FIG. 35 is an exploded view of a level, including a vial component, an extension restricting component and a front bushing, according to an exemplary embodiment.
Figure 36:
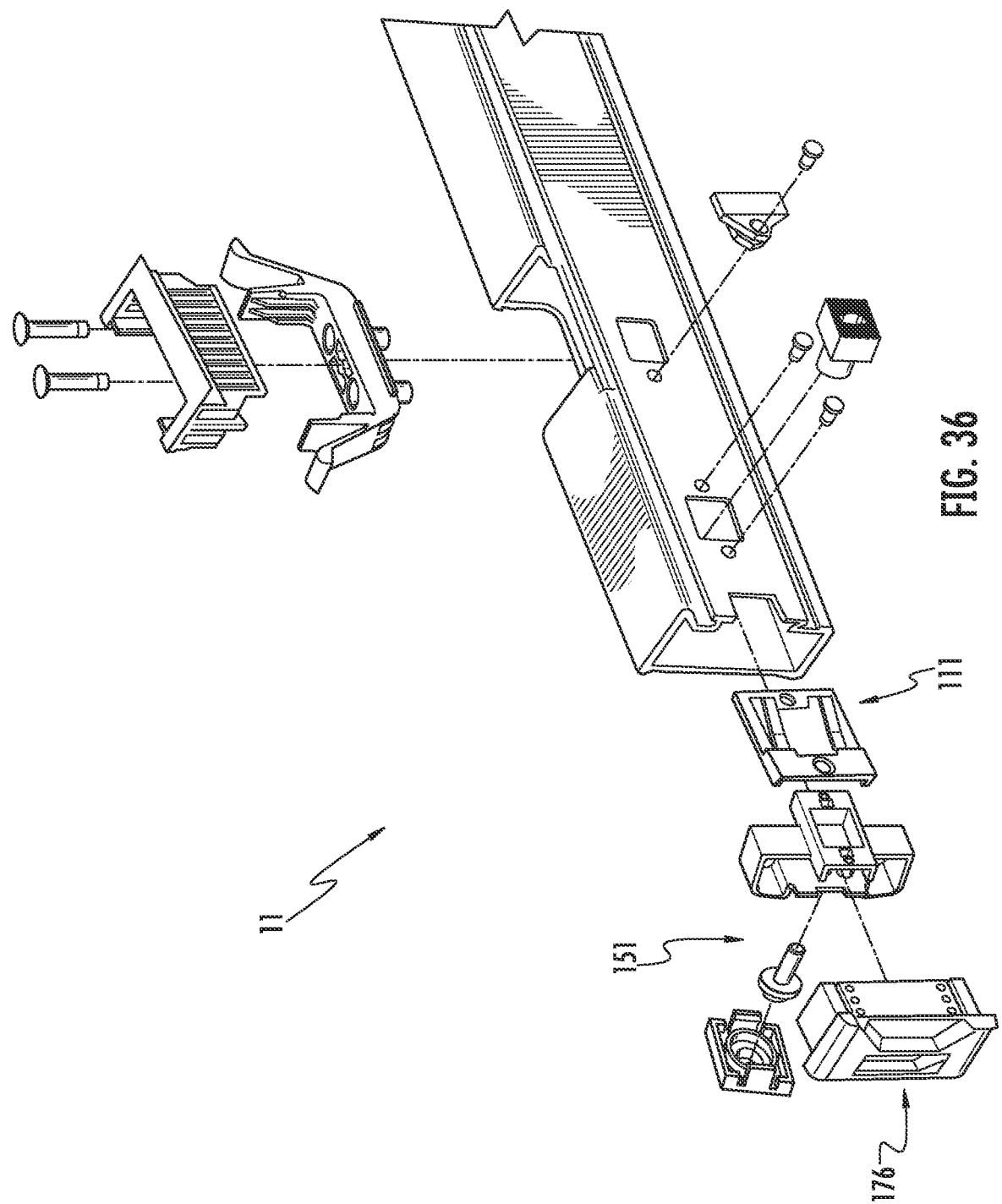
FIG. 36 is an exploded view of the level of FIG. 35, viewed from another perspective.

Referring to FIGS. 35-36, level 11 is shown according to an exemplary embodiment. Level 11 is substantially the same as level 10, except as disclosed and illustrated herein. Level 11 comprises front bushing 111 and braking mechanism 151. In the embodiment shown, springs 114 of front bushing 111 extend towards end cap 176.

Figure 37:
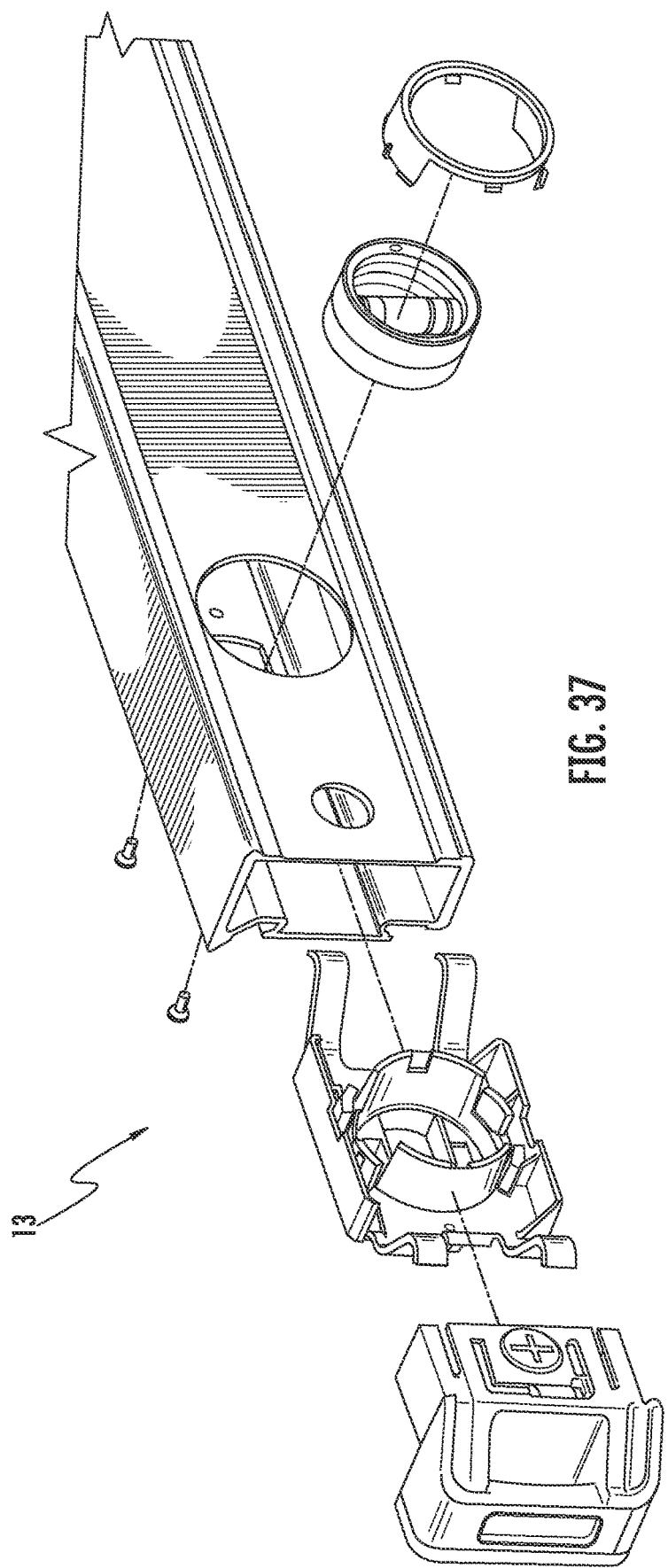
FIG. 37 is an exploded view of a level, including a vial component and an end cap, according to an exemplary embodiment.
Figure 38:
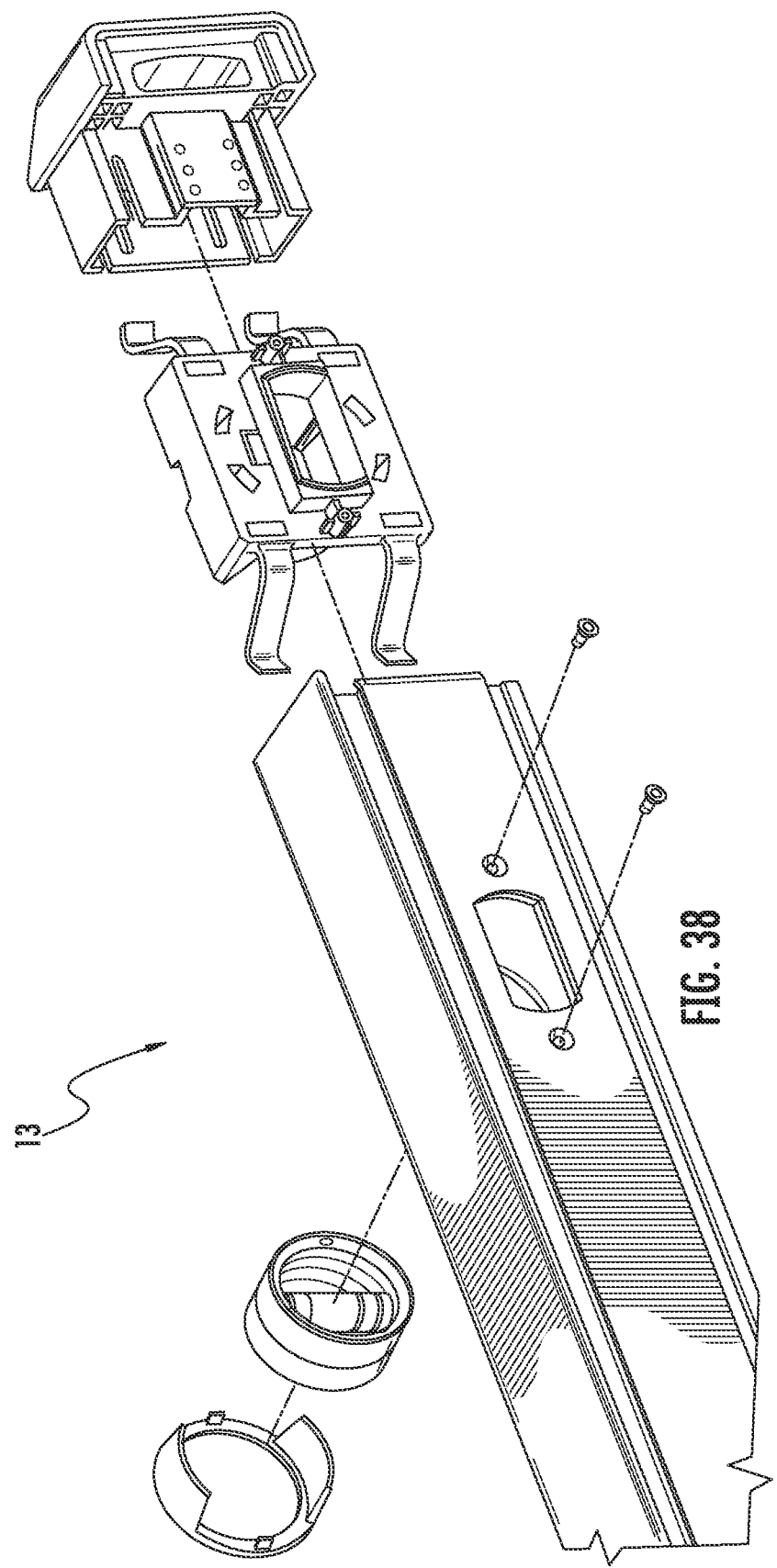
FIG. 38 is an exploded view of the level of FIG. 37, viewed from another perspective.

Referring to FIGS. 37-38, level 13 is shown according to an exemplary embodiment. Level 11 is substantially the same as level 10, except as disclosed and illustrated herein.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more components or elements, and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures. in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

The invention claimed is:

1. A level comprising:
   a frame comprising:
   a first planar base surface;
   a top surface opposing the base surface;
   a longitudinal axis;
   a fixed end of the frame along the longitudinal axis;
   an open end opposing the fixed end; and
   a slidable body member coupled to the frame that extends and retracts along the longitudinal axis of the frame, the slidable body member comprising:
   a second planar base surface generally coplanar with the first planar base surface;
   a first end; and
   a second end opposing the first end, the second end extending past the open end of the frame when the slidable body member is fully extended;
   an orientation measuring component coupled to one of the frame or the slidable body member; and
   a bushing that exerts a biasing force between the slidable body member and the frame, the bushing fixedly coupled to one of the frame or the slidable body member.

2. The level of claim 1, the bushing being fixedly coupled to the frame closer to the open end than the fixed end, the bushing exerting a biasing force between the slidable body member and the frame via a first force.

3. The level of claim 2, wherein the first force pushes the frame and the slidable body member away from each other.

4. The level of claim 2, comprising a second bushing fixedly coupled to the slidable body member closer to the first end of the slidable body member than the second end of the slidable body member, the second bushing exerting a biasing force between the slidable body member and the frame via a second force.

5. The level of claim 4, wherein the second force pushes the frame and the slidable body member away from each other.

6. The level of claim 4, wherein the second bushing comprises a stop surface that engages against a stop component fixedly coupled to the frame when the slidable body member is fully extended from the frame.

7. The level of claim 1, the first planar base surface of the frame and the second planar base surface of the slidable body member collectively comprising a generally continuous base surface to engage against a workpiece.

8. The level of claim 1, the level further comprising a braking mechanism comprising an adjustable interface and a brake to variably adjust a resistive force against the slidable body member along the longitudinal axis of the frame.

9. The level of claim 1, the slidable body member comprising an upper channel and the frame comprising a upper protrusion received within the upper channel, each of the upper channel and the upper protrusion extending longitudinally parallel to the longitudinal axis.

10. The level of claim 9, the slidable body member comprising a lower channel and the frame comprising a lower protrusion received within the lower channel, the lower protrusion extending away from the upper protrusion, each of the lower channel and the lower protrusion extending longitudinally parallel to the longitudinal axis.

11. The level of claim 1, wherein the slidable body member is sized such that an entire length of the slidable body member fits between the fixed end and the open end of the frame.

12. A level comprising:
   a frame comprising:
   a first planar base surface;
   a top surface opposing the base surface;
   a longitudinal axis;
   a first end of the frame along the longitudinal axis;
   a second end opposing the first end; and
   an orientation measuring component;
   a slidable body member coupled to the frame that extends and retracts along the longitudinal axis of the frame between a fully-extended configuration and a fully-retracted configuration, the slidable body member and the frame defining a maximum distance when in the fully-extended configuration and the slidable body member and the frame defining a minimum distance when in the fully-retracted configuration, the slidable body member comprising:
   a second planar base surface generally coplanar with the first planar base surface;
   a first end of the slidable body member; and a second end of the slidable body member opposing the first end, the second end extending past the second end of the frame when the slidable body member is in the fully-extended configuration; and a braking mechanism comprising an adjustable brake to variably adjust a resistive force against sliding the slidable body member along the longitudinal axis of the frame.

13. The level of claim 12, comprising a first bushing fixedly coupled to the frame closer to the second end of the frame than the first end of the frame, the first bushing exerting a biasing force between the slidable body member and the frame via a first force.

14. The level of claim 13, comprising a second bushing fixedly coupled to the slidable body member closer to the first end of the slidable body member than the second end of the slidable body member, the second bushing exerting a biasing force between the slidable body member and the frame via a second force.

15. The level of claim 14, wherein the first force pushes the frame and the slidable body member away from each other, and wherein the second force pushes the frame and the slidable body member away from each other.

16. The level of claim 12, the first planar base surface of the frame and the second planar base surface of the slidable body member collectively comprising a generally continuous base surface to engage against a workpiece.

17. The level of claim 12, the slidable body member comprising an upper channel and the frame comprising a upper protrusion received within the upper channel, each of the upper channel and the upper protrusion extending longitudinally parallel to the longitudinal axis, and the slidable body member comprising a lower channel and the frame comprising a lower protrusion received within the lower channel, the lower protrusion extending away from the upper protrusion, each of the lower channel and the lower protrusion extending longitudinally parallel to the longitudinal axis.

18. A level comprising:
a frame comprising:
a first planar base surface;
a top surface opposing the base surface;
a longitudinal axis;
a fixed end of the frame along the longitudinal axis;
an open end opposing the fixed end; and
an orientation measuring component;
an end cap assembly detachably coupled to the fixed end of the frame, the end cap assembly comprising an engagement pivot configured to engage an opening in the frame, the engagement pivot comprising a pivot base and a pivot end, the pivot end rotates with respect to the pivot base when the engagement pivot is detached from the frame; and
a slidable body member coupled to the frame that extends and retracts along the longitudinal axis of the frame, the slidable body member comprising:
a second planar base surface generally coplanar with the first planar base surface;
an enclosed end; and
an adjustable end opposing the enclosed end, the adjustable end extending past the open end of the frame when the slidable body member is fully extended.

19. The level of claim 18, the first planar base surface of the frame and the second planar base surface of the slidable body member collectively comprising a generally continuous base surface to engage against a workpiece.

20. The level of claim 18, wherein the pivot end rotates with respect to the pivot base about a second axis perpendicular to the longitudinal axis of the frame, wherein the slidable body member is sized such that an entire length of the slidable body member fits between the fixed end and the open end of the frame, the first planar base surface of the frame and the second planar base surface of the slidable body member collectively comprising a generally continuous base surface to engage against a workpiece.

* * * * *